(12) United States Patent
Enami et al.

(10) Patent No.: US 7,551,829 B2
(45) Date of Patent: Jun. 23, 2009

(54) WAVEGUIDE, WAVEGUIDE MODULE, OPTICAL TRANSMISSION DEVICE, AND METHOD OF MANUFACTURING WAVEGUIDE

(75) Inventors: Akira Enami, Nara (JP); Yoshihisa Ishida, Nara (JP); Tamio Fujisaki, Nara (JP); Hayami Hosokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/630,917

(22) PCT Filed: Jun. 28, 2005

(86) PCT No.: PCT/JP2005/011840

§ 371 (c)(1),
(2), (4) Date: Dec. 27, 2006

(87) PCT Pub. No.: WO2006/001452

PCT Pub. Date: Jan. 5, 2006

(65) Prior Publication Data

US 2008/0031579 A1    Feb. 7, 2008

(30) Foreign Application Priority Data

Jun. 28, 2004   (JP)   ............................. 2004-190368

(51) Int. Cl.
*G02B 6/00* (2006.01)
*G02B 6/12* (2006.01)
*G02B 6/42* (2006.01)
*G02B 6/02* (2006.01)
*G02B 6/10* (2006.01)
*G02B 1/12* (2006.01)
*G02B 1/10* (2006.01)
*B29D 11/00* (2006.01)
*B05D 5/06* (2006.01)

(52) U.S. Cl. ............................. 385/141; 385/14; 385/43; 385/128; 385/129; 385/132; 385/142; 385/144; 264/1.24; 264/1.38; 264/1.7; 264/2.2; 264/2.5; 427/162; 427/163.1

(58) Field of Classification Search .................. 385/14, 385/43, 128, 129, 132, 141, 142, 144; 264/1.24, 264/1.38, 1.7, 2.2, 2.5
See application file for complete search history.

(56) References Cited

U.S. PATENT DOCUMENTS 3,659,916 A * 5/1972 Marcatili .................... 385/132

(Continued)

FOREIGN PATENT DOCUMENTS

JP   10-293220   11/1998

(Continued)

OTHER PUBLICATIONS

International Search Report for PCT/JP2005/011840 mailed Aug. 23, 2005 (2 pages).

*Primary Examiner*—Brian M. Healy
*Assistant Examiner*—Hung Lam
(74) *Attorney, Agent, or Firm*—Osha • Liang LLP

(57) ABSTRACT

In a waveguide 10 including a substrate 1, a lower clad 2, an upper clad 3, and a core 4, the outline of a cross section perpendicular to the light propagating direction of the core 4 surrounded by the lower clad 2 has a shape curved with respect to the center of the cross section. The separation in the waveguide is thereby prevented, and the reliability of the optical property is enhanced.

6 Claims, 31 Drawing Sheets

U.S. PATENT DOCUMENTS

| | | | |
|---|---|---|---|
| 6,681,069 B2 * | 1/2004 | Galarza et al. | 385/50 |
| 2004/0037497 A1 * | 2/2004 | Lee | 385/28 |
| 2005/0213916 A1 * | 9/2005 | Fukuda et al. | 385/132 |

FOREIGN PATENT DOCUMENTS

| JP | 11-305055 | 11/1999 |
|---|---|---|
| JP | 2001-42170 | 2/2001 |
| JP | 2001-281482 | 10/2001 |
| JP | 2002-65449 | 2/2002 |

* cited by examiner

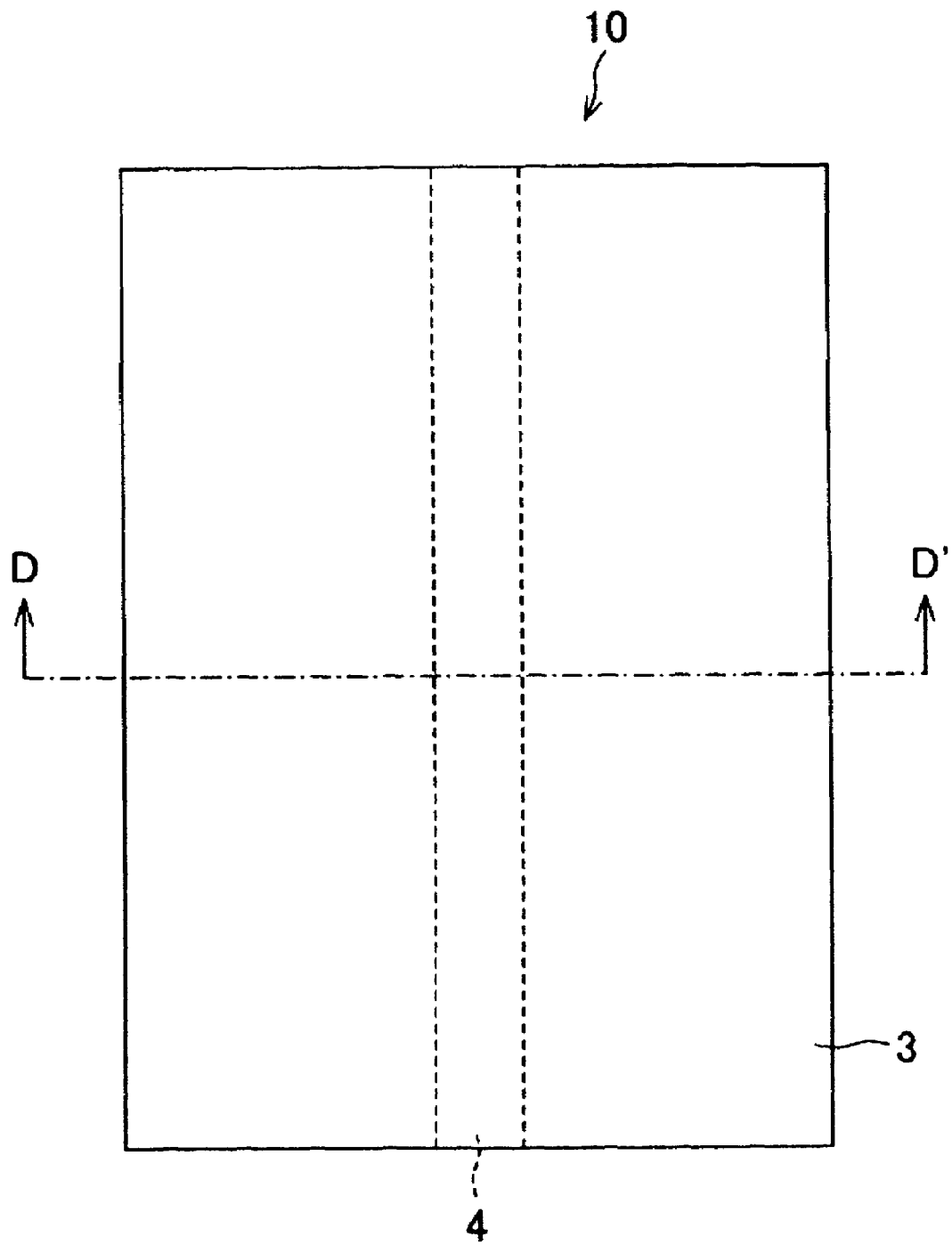

103　101

103　101

WAVEGUIDE, WAVEGUIDE MODULE, OPTICAL TRANSMISSION DEVICE, AND METHOD OF MANUFACTURING WAVEGUIDE

TECHNICAL FIELD

The present invention relates to a waveguide, a waveguide module equipped with the same, an optical transmission device, and a method of manufacturing the waveguide.

BACKGROUND ART

Communication techniques or energy transmission techniques, calculation and control processing techniques etc. using light are recently being given attention. For example, an optical fiber for connecting a plurality of communication devices, an optical inter-connection for connecting the print substrates, an optical circuit substrate for connecting a plurality of circuits through light, an optical integrated circuit (optical IC, OEIC (Opto Electronics Integrated Circuit) for performing information transmission using light in the circuit etc. have been developed. Since the large volume of data can be transmitted at high speed and the number of wirings can be reduced compared to the conventional device using electricity in addition to the functions of wiring and circuit using electricity of the prior art through the use of light, and the device can be miniaturized.

A waveguide for guiding the optical signal or the optical energy is used in communication and energy transmission that employs light. The waveguide is generally configured with a core, which is the portion having a refraction index higher than the upper and lower clad layers, formed between the lower clad layer and the upper clad layer, where the light that has entered the core is transmitted while being totally reflected at the interfaces of each clad layer and the core.

Conventionally, when manufacturing such waveguide, the core and the clad are formed by using quartz as the material and performing ion injection method, ion exchange process etc. to the quartz.

Furthermore, development in waveguide made from resin that excels in material cost is recently being advanced. However, when forming such waveguide, a core pattern using a photoresist is formed one sheet at a time, and processing is subsequently performed by reactive ion etching etc. in order to form the core configuration on the surface of the clad layer, and thus a semiconductor process using an expensive facility and device is required in the manufacturing steps, which thus increases the manufacturing cost.

A method is being reviewed of pressing a stamper having a convex shape of the core pattern of the waveguide against the polymer in the molten state or in the liquid state and curing the polymer in such state to transfer (copy) the groove of the core pattern thereby obtaining the lower clad layer.

When manufacturing the core groove of the waveguide through copying in manufacturing the waveguide using the polymer, that is, the waveguide made of resin, a release tapered shape must be formed at the cross sectional shape of the core so that the stamper can be easily released, which cross sectional shape of the core shape is generally a trapezoid instead of a rectangle. The shape of the waveguide manufactured using such method is disclosed in, for example, Japanese Laid-Open Patent Publication No. 2003-240991 (Published on Aug. 27, 2003), which is a Japanese Laid-Open Patent Publication.

In recent years, a technique of replacing the conventional FPC (Flexible Printed Circuit) substrate, electrical wiring plate etc. by the film waveguide or the waveguide having flexibility is being developed.

However, in the waveguide in which the cross sectional shape of the core is a trapezoid or a rectangle, separation easily occurs due to the difference in coefficient of thermal expansion (thermal expansion coefficient) particularly between the core and the clad at the core-clad interface.

When the core and the clad separates, a microscopic chip forms at the core or microscopic clad resin attaches to the surface of the core thereby scattering the light propagated through the core at such microscopic portion and causing optical loss. In the single mode waveguide, the difference in the refraction index of the core and the clad at the separated portion changes, the amount of light that leaks out from the core to the clad changes, and optical loss occurs. Furthermore, if one portion separates, moisture enters from the relevant portion, separation advances due to change in temperature and the reliability further lowers.

The flexibility is desired for the film waveguide expected to replace the FPC substrate and the electrical wiring plate, but the core-clad interface tends to separate though repetitive bending.

The cause of this drawback is described using FIGS. 9(a) and 9(b). FIG. 9(a) shows cross sectional views of the waveguide which cross sectional shape of the core is a trapezoid and the waveguide which cross sectional shape of the core is a triangle. As shown in the figures, each waveguide includes a lower clad 101, an upper clad 102, and a core 103. The core 103 is formed by filling a material having a refraction index and the thermal expansion coefficient different from each clad in the groove formed in the lower clad 101. The material of both clad may be the same or may be different.

Since the thermal expansion coefficient of the core 103 and the thermal expansion coefficient of each clad are different, shearing force generates in between. The most general portion where the shearing force acts is the interface between the core 103 and the lower clad 101.

FIG. 9(b) shows cross sectional views showing the portion surrounded by a broken line in each waveguide shown in FIG. 9(a), that is, the interface between the core 103 and the lower clad 101. As shown in the figure, if the core shape is a trapezoid or a rectangle, the shearing force acts greatly on the interface due to the difference in the respective stretching force caused by the difference in the coefficient of linear expansion (thermal expansion coefficient), and separation occurs at the relevant location.

DISCLOSURE OF THE INVENTION

The present invention aims to provide, in view of the above problems, a waveguide in which separation is prevented and reliability of the optical property is enhanced, an optical transmission device using the same, and an method of manufacturing the waveguide.

In order to solve the above problem, the waveguide of the present invention is a waveguide of the present invention including a core for enclosing and propagating light, and a clad layer including a groove part for surrounding the core; wherein the core has a shape in which at least one part of the portion contacting the side surface or the bottom surface of the groove part at a cross section perpendicular to an optical direction of the light propagated through the core is curved with respect to the center of the cross section.

According to the configuration, since the interface of the core and the clad layer is curved, the direction the shearing force generated at the interface of the core and the lower clad acts differs among the microscopic regions of the interface due to the difference in the thermal expansion coefficient of the core or clad layer, bending of the waveguide etc. the shearing force acting on the entire interface is dispersed and reduced. Therefore, the waveguide in which the separation is prevented from occurring at the interface of the core and the clad layer and the reliability of the optical property is enhanced is realized.

The core may be a shape in which at least one part of the portion contacting the side surface of the groove part at the cross section is curved with respect to the center of the cross section.

According to the present invention, since the direction the shearing force generated at the interface of the core and the side surface of the groove part arranged in the clad layer acts differs among the microscopic regions of the interface, the shearing force acting on the entire interface is dispersed and reduced. Therefore, separation is prevented from occurring at the interface.

The core may be a shape in which at least one part of the portion contacting the bottom surface of the groove part at the cross section is curved with respect to the center of the cross section.

In this case, since the direction the shearing force generated at the interface of the core and the bottom surface of the groove part arranged in the clad layer, and at the interface of the core and the side surface and the bottom surface of the groove part acts differs among the microscopic regions of the interface, the shearing force acting on the entire interface is dispersed and reduced. Therefore, separation is prevented from occurring at the interface.

Furthermore a second layer may be formed so as to clad layer and the core; wherein the core has a shape in which at least one part of the portion contacting the second clad layer at a cross section is curved with respect to the center of the core.

According to the present invention, since the direction the shearing force generated at the interface of the second clad layer and the core acts differs among the microscopic regions of the interface, the shearing force acting on the entire interface is dispersed and reduced. Therefore, separation is reliably prevented from occurring at the interface of the clad layer and the core, and at the interface of the second clad layer and the core.

The clad layer may have a flexural modulus of smaller than or equal to 1,000 MPa.

According to the above configuration, in the manufacturing steps of the waveguide, the shape of the core can be controlled by controlling the pressing force to be applied to the clad layer. For example, the resin for forming the core is enclosed in the groove part, the pressing force is applied to the surface of the clad layer to deform the clad layer and deform the resin filled in the groove part, and the resin is cured in such state, thereby forming a core having the above described cross sectional shape. Therefore, the inexpensive waveguide of reduced manufacturing cost is realized.

The waveguide may be made up of resin layers having a total thickness of less than or equal to 300 μm. If the total thickness of the resin layer is less than or equal to 300 μm, the waveguide is suitably used in a bent manner or used winded around the shaft etc. The device arranged with the waveguide can be miniaturized since the installation space of the waveguide is reduced.

The waveguide has an elastic modulus of greater than or equal to 20 MPa and smaller than or equal to 250 MPa.

According to the present invention, the waveguide is suitably installed in the driving part (hinge part, rotating part etc.) of the electronic device, etc. Furthermore, the device arranged with the waveguide can be miniaturized since the installation space of the waveguide is reduced. The tensile force generated at the connecting part of the waveguide by twisting the waveguide can be reduced to an extent that does not cause connection failure if the elastic modulus is greater than or equal to 20 MPa and less than or equal to 250 MPa.

A waveguide module of the present invention has the waveguide described above and a light projecting element for converting an electrical signal to light and emitting the light are arranged so that the light emitted from the light projecting element enters the core of the waveguide.

According to the above configuration, the light emitted from the light projecting element is appropriately propagated by the waveguide.

A waveguide module of the present invention has the waveguide described above and a light receiving element for converting the received light to an electrical signal are arranged so that the light propagated by the waveguide enters the light receiving element.

According to the present invention, the light propagated by the waveguide is appropriately received by the light receiving element.

A waveguide module of the present invention has the waveguide described above, a light projecting element for convening an electrical signal to light and emitting the light and a light receiving element for converting the received light to an electrical signal are arranged so that the light emitted from the light projecting element enters the core of the waveguide and the light that has entered propagates via the core and enters the light receiving element.

According to the above configuration, the light emitted from the light projecting element is appropriately propagated by the waveguide, and the light propagated by the waveguide is appropriately received by the light receiving element.

In order to achieve the above aim, an optical transmission device of the present invention includes a main body and a driving part that relatively moves or rotates with respect to the main body; where an optical signal is transmitted between the main body and the driving part using the waveguide including a stacked body (stacked body of resin layer having flexibility) of resin layer having a total thickness of less than or equal to 300 μm, a waveguide having elastic modulus of greater than or equal to 20 MPa and less than or equal to 250 MPa, or a waveguide of resin layer having a total thickness of less than or equal to 300 μm and having elastic modulus of greater than or equal to 20 MPa and less than or equal to 250 MPa.

According to the above configuration, the waveguide is installed in a shape taking the movement or the rotation of the driving into consideration. Furthermore, even if the bending state of the waveguide changes with the movement or the rotation of the driving part, the direction the shearing force generated at the interface of the core and the clad layer acts differs among microscopic regions of the interface, and thus the shearing force acting on the entire interface can be dispersed and reduced. Thus, the allowable amount with respect to the shearing force increases and the separation is less likely to occur.

In order to achieve the above aim, a method of manufacturing a waveguide of the present invention includes a core for enclosing and propagating light and a clad layer including a groove part for surrounding the core; the method including the steps of forming the groove part on a surface of the clad layer made up of first resin; filling a second resin into the groove part; and forming the core by applying pressure to the clad layer to deform the shape of the groove part, and curing the second resin while deforming the second resin according to the deformation of the shape of the groove part.

According to the above manufacturing method, at least one part of the portion contacting the side surface or the bottom surface of the groove part at the cross section perpendicular to the optical axis direction of the second resin can be deformed to a shape curved with respect to the center of the cross section by applying the pressing force to the clad layer. When the second resin is cured in such state, a core having a shape in which at least one part of the portion contacting the side surface or the bottom surface of the groove part at the cross section perpendicular to the optical axis direction is curved with respect to the center of the cross section is formed.

Therefore, since the direction the shearing force generated at the core and the clad acts differs among microscopic regions of the interface by the difference in the thermal expansion coefficient of the core and the clad layer, the bending of the waveguide etc., the waveguide in which the shearing force acting on the entire interface is dispersed and reduced is manufactured. Thus, the waveguide in which the separation is prevented from occurring at the interface of the core and the clad layer, and the reliability of the optical property is enhanced in the waveguide is realized.

In the step of forming the groove part, the resin layer is cured while pressure contacting a stamper having a reversal pattern of the groove part to a resin layer made up of the first resin to form the upper clad layer.

In this case, in the manufacturing method of forming the core by transferring (copying) the shape of the stamper, the curved shape is easily formed at the cross section of the core. Therefore, the waveguide including a core having a curved shape at the cross section thus preventing separation and enhancing the reliability of the optical property is manufactured inexpensively and in large amounts.

In order to achieve the above aim, a method of manufacturing another waveguide including a core for enclosing and propagating light, and a clad layer including a groove part for surrounding the core; the method including the steps of forming the groove part including a curved part at least one part of the side surface or the bottom surface in the clad layer; and forming the core by filling and curing a second resin in the groove part.

According to the above manufacturing method, the core in which at least one part of the portion contacting the side surface or the bottom surface of the groove part at the cross section perpendicular to the optical axis direction is curved with respect to the center of the cross section is formed by forming a groove part having a curved part at least one part of the side surface or the bottom surface in the clad layer and filling and curing the second resin in the groove part.

Therefore, the waveguide in which the direction the shearing force generated at the interface of the core and the clad layer acts differs among the microscopic regions of the interface thus dispersing and reducing the shearing force acting on the entire interface is manufactured. The waveguide in which separation is prevented from occurring at the interface of the core and the clad layer, and the reliability of the optical property is enhanced is thereby realized.

In the step of forming the groove part, the groove part is formed by irradiating energy beam through a shielding including an opening.

In this case, the processing shape of the groove part can be changed by changing the energy density of the energy beam, and the groove part having a curved part at least one part of the side surface or the bottom surface in the cross section perpendicular to the optical axis direction in the clad layer is formed.

Therefore, the waveguide in which the shearing force generated at the interface of the core and the clad layer is dispersed and reduced is manufactured. Thus, the waveguide in which the separation is prevented from occurring at the interface of the core and the clad layer, and the reliability of the optical property is enhanced is realized.

In order to achieve the above aim, a method of manufacturing another further waveguide of the present invention including a core for enclosing and propagating light, and a clad layer including a groove part for surrounding the core; the method including the steps of depositing a second resin on a first clad layer to form a core layer; forming a core having a shape in which at least one part of an outline of a cross section perpendicular to an optical axis direction of the light propagating through the core is curved with respect to the center of the cross section by performing etching on the core layer; and forming a second clad layer so as to cover the core and the first clad layer.

According to the above manufacturing method, the waveguide in which the core having a shape in which at least one part in the outline of the cross section perpendicular to the propagating direction of the light is curved with respect to the center of the cross section is surrounded by the second clad layer is manufactured.

Therefore, the waveguide in which the direction the shearing force generated at the interface of the core and the second clad layer acts differs among microscopic regions of the interface and thus the shearing force acting on the entire interface is dispersed and reduced is manufactured. Thus, the waveguide in which the separation is prevented from occurring at the interface of the core and the second clad layer is prevented, and the reliability of the optical property is enhanced is realized.

In the step of forming the core, the core is formed by performing reactive ion etching through a shielding.

In this case, the core having a shape in which the outline of the cross section is curved with respect to the center by controlling parameters such as gas flow rate, chamber pressure, plasma output etc. when performing reactive ion etching, or appropriately setting the shape of the shielding is formed.

BEST MODE FOR CARRYING OUT THE INVENTION

Embodiment 1

Figure 1:
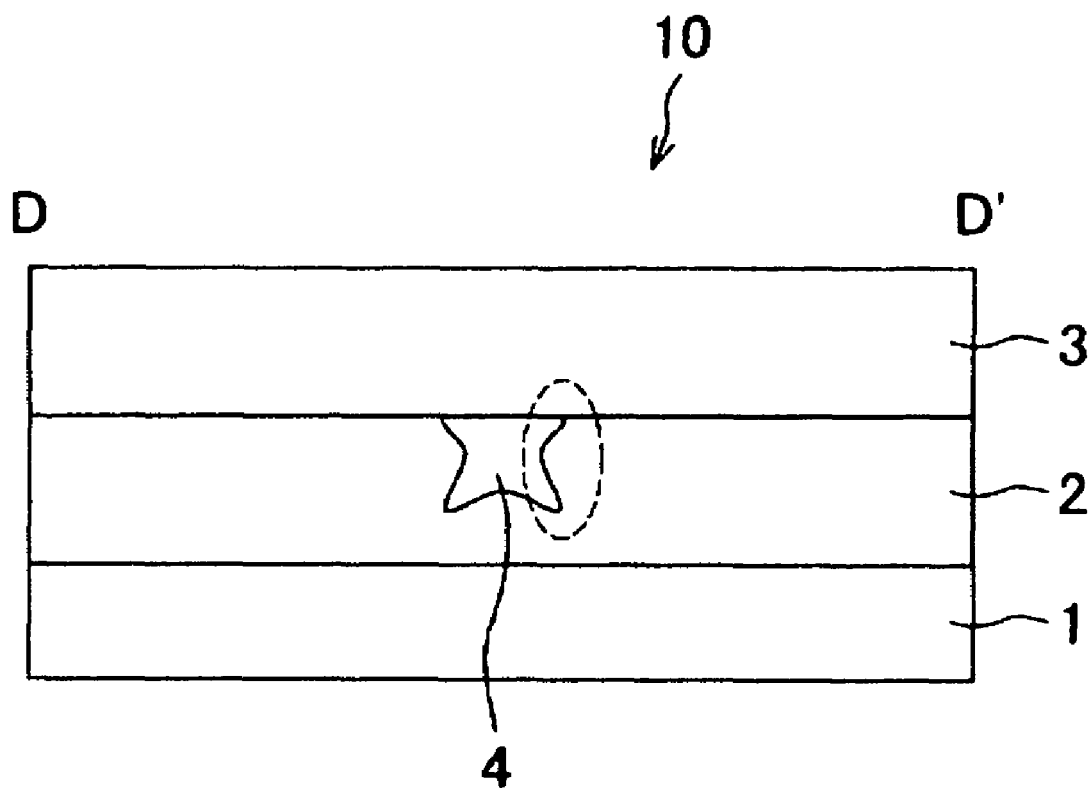
FIG. 1(a) is a plan view of a waveguide according to one embodiment of the present invention.
FIG. 1(b) is a cross sectional view of the waveguide shown in FIG. 1(a).
FIG. 1(c) is an enlarged view showing a shearing force generated at the interface of the core and the clad in FIG. 1(b).

One embodiment of the present invention will now be described using the figures. FIG. 1(a) is a front view of a waveguide 10 according to the present embodiment, and FIG. 1(b) is a cross sectional view taken along the cross section of D-D'.

As shown in FIG. 1(b), the waveguide 10 is configured by a substrate 1, a lower clad (clad layer) 2, an upper clad (second clad layer) 3, and a core 4. The core 4 is formed so as to be surrounded by the groove (groove part) arranged in the lower clad 2, and is made of a material having a refraction index higher than the lower clad 2 and the upper clad 3. Thus, the light that has entered the core 4 from one end face of the core 4 is transmitted while being totally reflected at the interface of the clad 2, 3 and the core 4, and is exit from the other end face of the core 4.

The material of the substrate 1 is not particularly limited, but a glass substrate is used in the present embodiment.

The lower clad 2 is made of acrylic resin (ultraviolet curable resin) having a bending elasticity modulus after curing of less than or equal to about 1,000 MPa.

The upper clad 3 is not particularly limited, but the material same as the lower clad 2 is used in the present embodiment.

The core 4 is made of ultraviolet curable resin having a refraction index higher than the lower clad 2 and the upper clad 2.

Figure 1C:
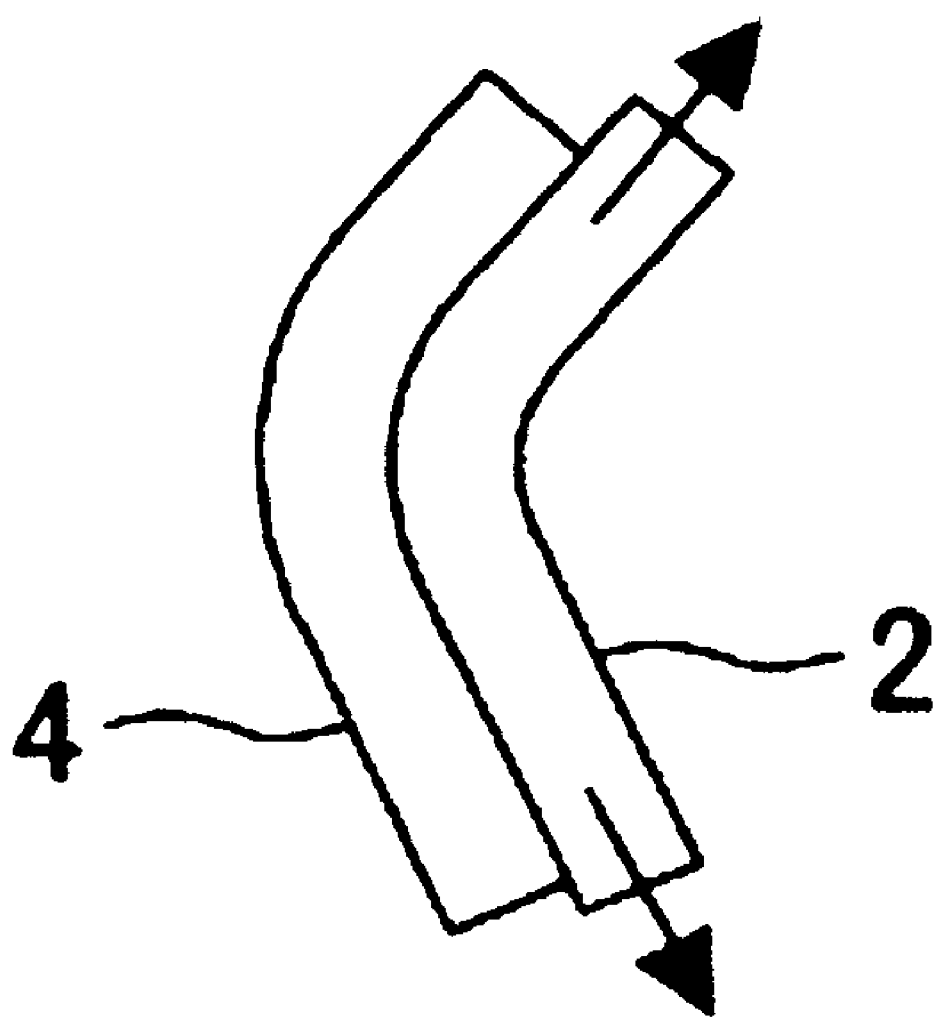
Figure 2A:
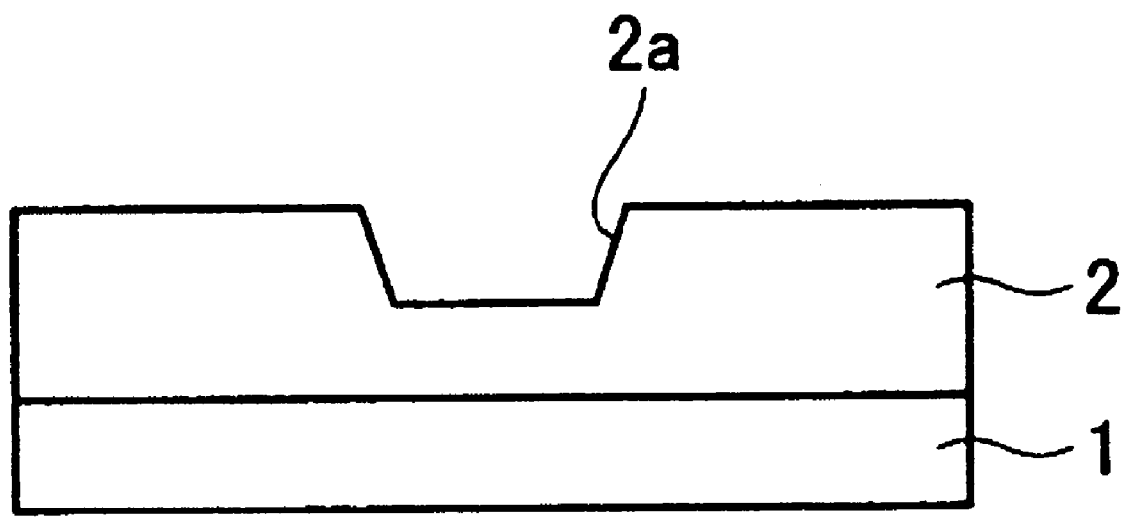
FIG. 2(a) is a cross sectional view showing a manufacturing step of the waveguide according to one embodiment of the present invention.
Figure 2B:
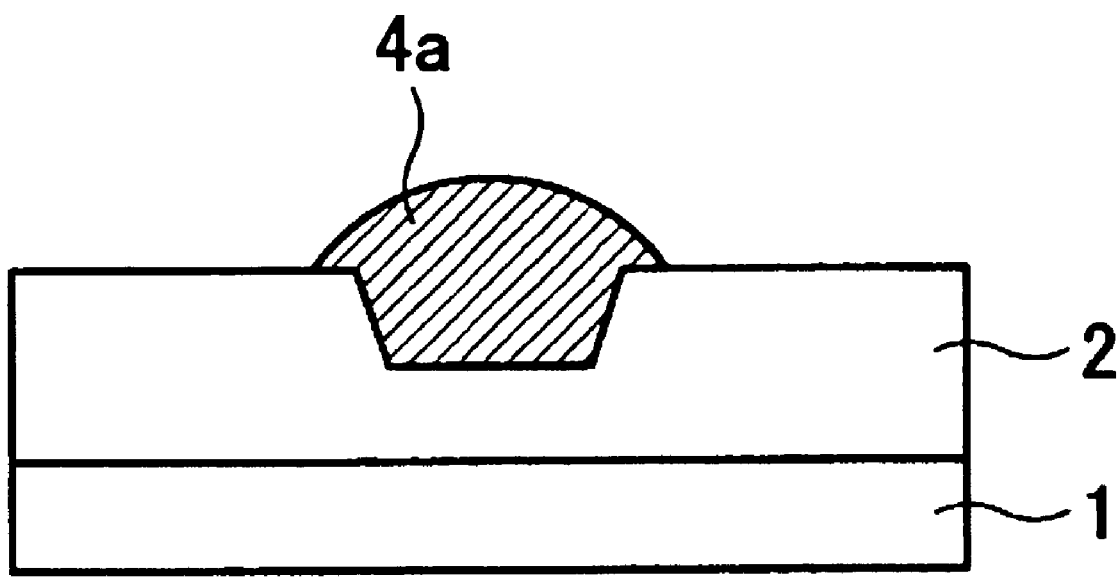
FIG. 2(b) is a cross sectional view showing the manufacturing step of the waveguide according to one embodiment of the present invention.
Figure 2C:
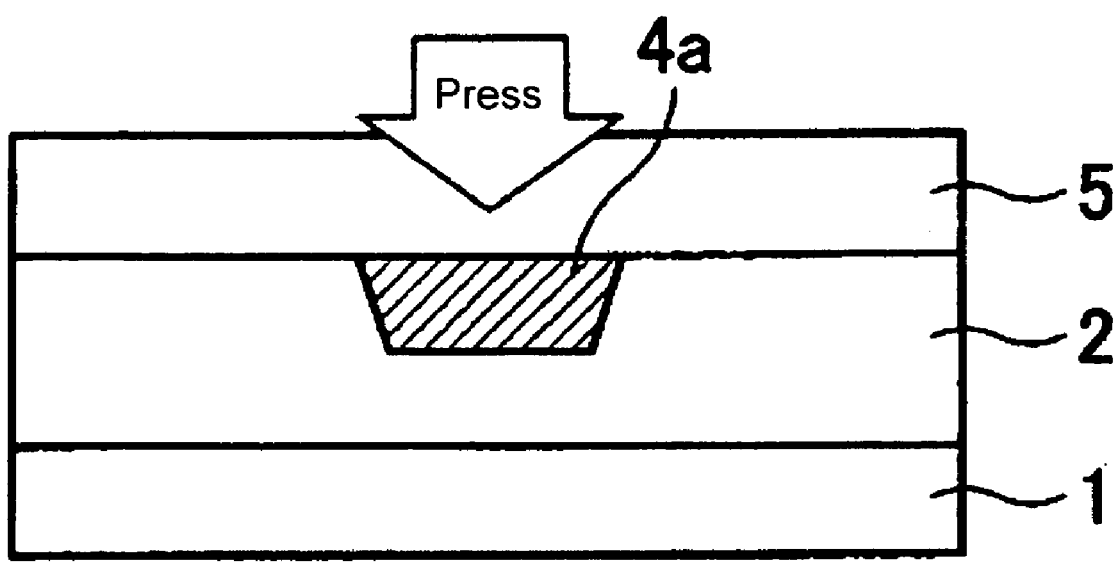
FIG. 2(c) is a cross sectional view showing the manufacturing step of the waveguide according to one embodiment of the present invention.
Figure 2D:
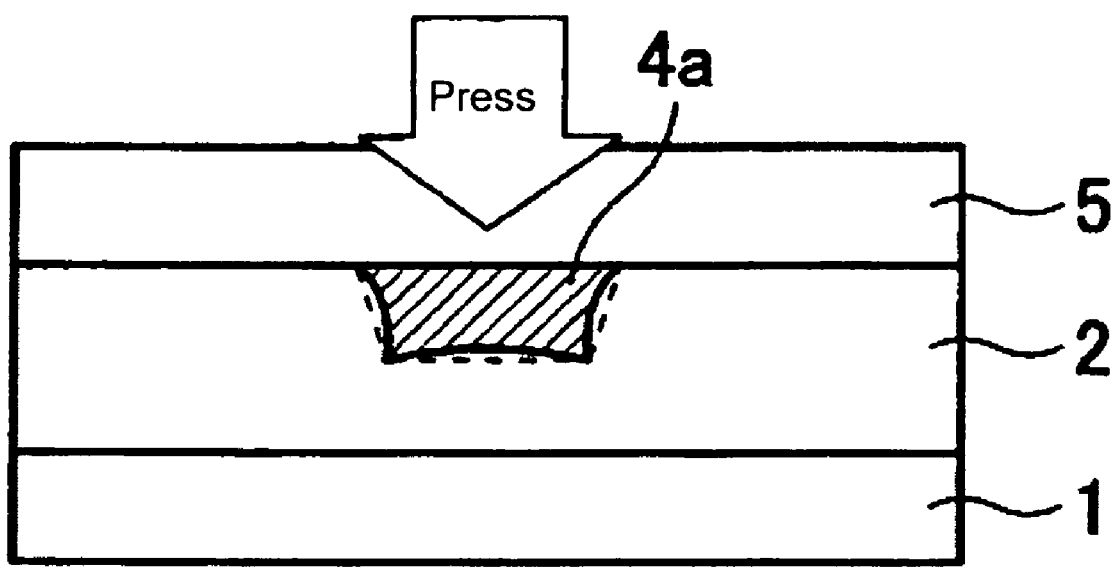
FIG. 2(d) is a cross sectional view showing the manufacturing step of the waveguide according to one embodiment of the present invention.
Figure 2E:
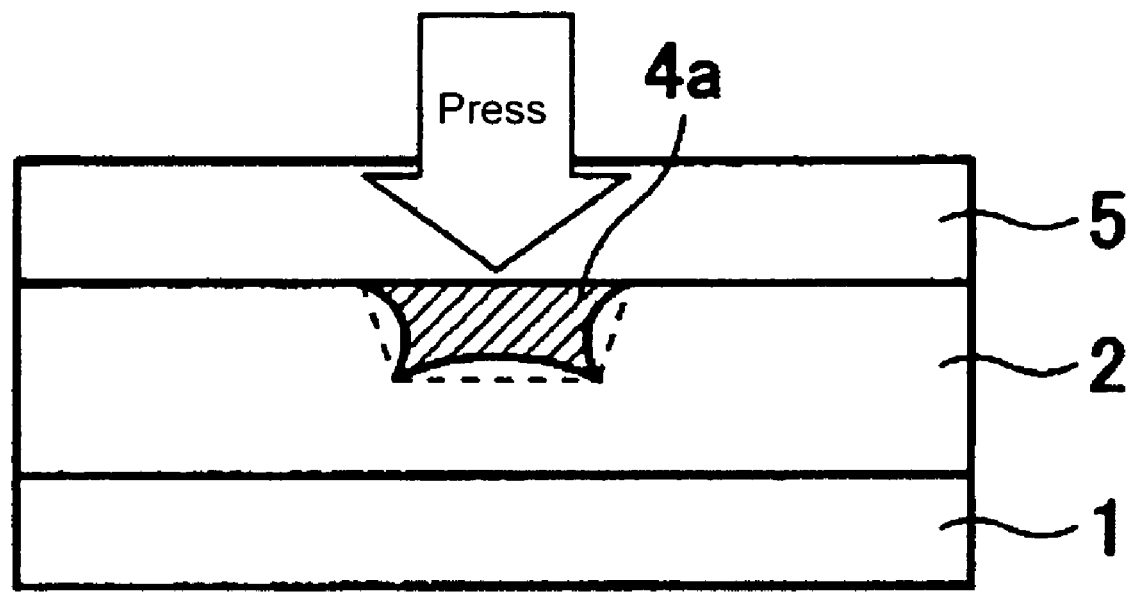
FIG. 2(e) is a cross sectional view showing the manufacturing step of the waveguide according to one embodiment of the present invention.
Figure 2F:
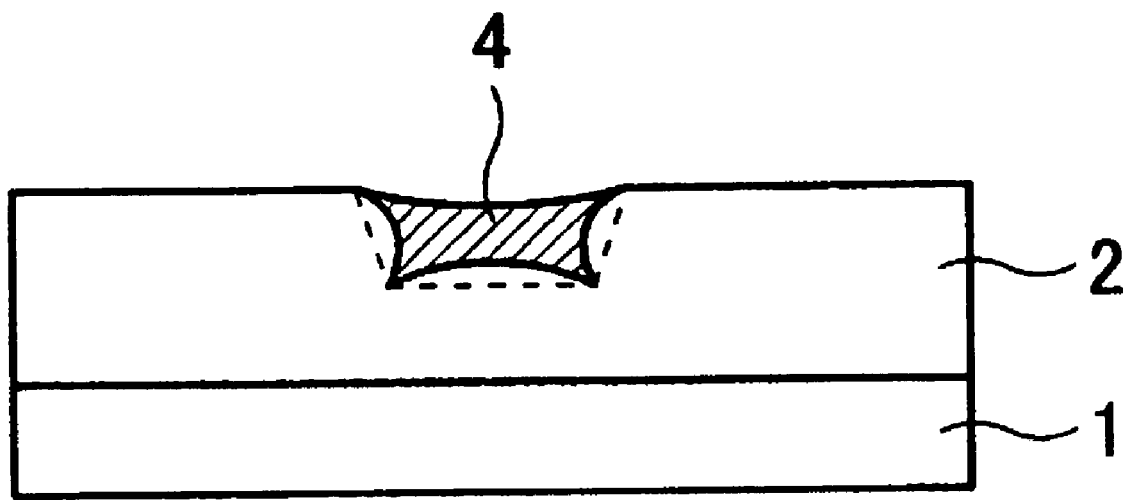
FIG. 2(f) is a cross sectional view showing the manufacturing step of the waveguide according to one embodiment of the present invention.
Figure 2G:
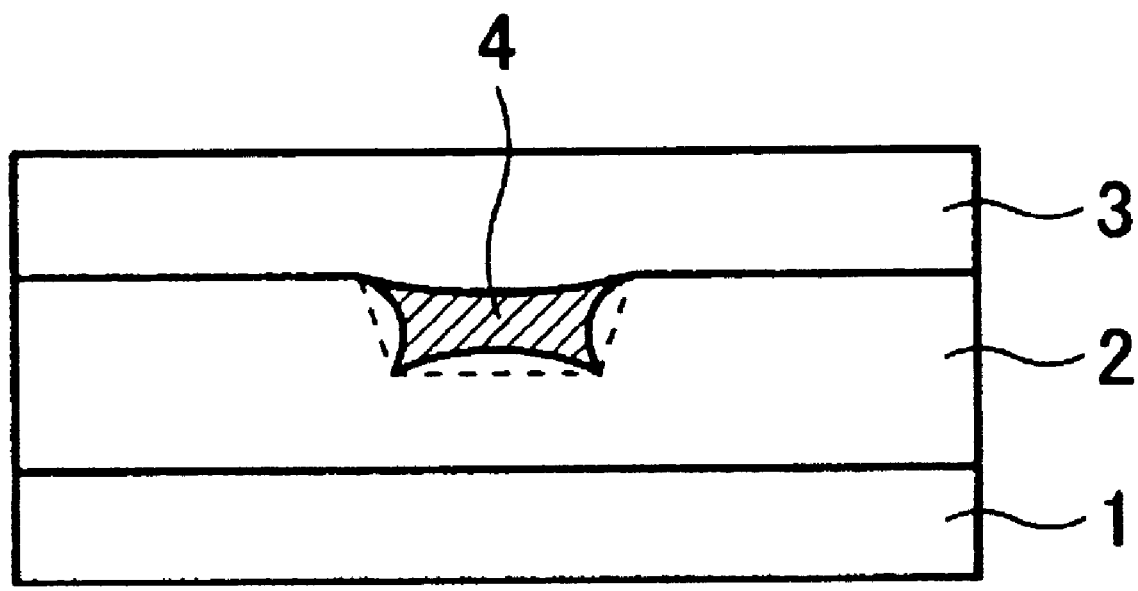
FIG. 2(g) is a cross sectional view showing the manufacturing step of the waveguide according to one embodiment of the present invention.

In the waveguide 10 according to the present embodiment, the cross sectional shape of the core 4 is not a trapezoid or a rectangle but is a wedge shape, that is, a shape in which each side of the trapezoid or the rectangle is depressed (curved) inward, as shown in FIG. 1(b). FIG. 1(c) is an enlarged view showing the interface (portion surrounded with broken line) of the core 4 and the lower clad 2 of FIG. 1(b). Since the interface of the core 4 and the lower clad 2 is curved in the waveguide 10 according to the present embodiment, the direction the shearing force generated at the interface of the core 4 and the lower clad 2 acts differs among the microscopic regions of the interface due to difference in thermal expansion coefficient of the core 4 and the lower clad 2, the bending of the waveguide 10 etc. Therefore, the shearing force on the entire interface is dispersed and reduced. The acceptable amount (acceptable value) of the shearing force thus increases and separation is less likely to occur in the waveguide 10.

A method of manufacturing the waveguide 10 will now be described. FIGS. 2(a) to 2(g) are cross sectional views showing the manufacturing steps of the waveguide 10.

In the manufacturing steps of the waveguide 10, the non-cured ultraviolet curable resin (lower clad resin) is applied (deposited) on the substrate 1.

The surface of the ultraviolet curable resin is pressure contacted with a stamper (not shown) having an inverse pattern of the waveguide pattern formed with a release tapered shape on the surface, and ultraviolet ray is irradiated in this state to cure the ultraviolet resin.

Therefore, the lower clad 2 transferred with the core groove (groove part) 2a that becomes the waveguide pattern is formed on the substrate 1, as shown in FIG. 2(*a*). In the present embodiment, the height (depth) of the core groove 2a is 50 μm, and the width of the bottom part is 50 μm.

The ultraviolet curable resin (core resin) 4a having a refraction index higher than the lower clad 2 is filled into the core groove 2a (see FIG. 2(*b*)). The material of the core resin 4a only needs to be a resin having a refraction index higher than the lower clad 2, and is not particularly limited, but acrylic resin is used herein.

A flat stamper 5 is pressed onto the lower clad 2 and the core resin 4a in the direction of the substrate 1 to spread the excessive core resin 4a, as shown in FIG. 2(*c*). The side surface and the bottom surface of the core groove 2a in the lower clad 2 that is already cured and formed and has elasticity are pushed into the core resin 4 if the pressing force of the stamper 5 is increased, and the core shape starts to depress (starts to curve) inward, as shown in FIG. 2(*d*). That is, the formed lower clad 2 for shaping the core 4 deflects and the core resin 4a starts to depress.

As shown in FIG. 2(*e*), when the pressing force of the stamper 5 is further increased, the side surface and the bottom surface of the core groove 2a in the lower clad 2 are further pushed into the core resin 4a, and the core shape is further depressed inward.

The ultraviolet ray is irradiated in this state to cure the core resin 4a, and the stamper 5 is separated. The core 4 having a wedge portion at the cross section is thereby formed, as shown in FIG. 2(*f*). As shown in this figure, the upper surface of the core 4, that is, the surface to be subsequently formed with the upper clad 3 also depresses (curves) inward. This is because the core resin 4a cures and shrinks.

The ultraviolet curable resin having a refraction index smaller than the core 4 is applied on the lower clad 2 and the core 4 and then exposed to form the upper clad 3, as shown in FIG. 2(*g*). The waveguide 10 is thereby completed.

Therefore, the reliability with respect to heat of the interlayer adhesiveness in the waveguide (optical communication component) can be enhanced by forming the cross sectional shape of the core 4 to a shape having a depressed (curved) portion, that is, a shape having a wedge instead of to a trapezoid or a rectangle as in the prior art.

According to the method of the present embodiment, the bottom surface and the side surface are respectively depressed inward to a maximum of 10 μm in the core 4 having a height of 50 μm and a width of 50 μm. This is a sufficient deformation amount to prevent separation by the shearing force generated at the interface of the core 4 and the lower clad 2.

The depression can be formed at the side surface (core side wall) and the bottom surface (core surface) of the core 4 and the shape thereof can be controlled with a configuration in which the desired pressure is intentionally applied to the side wall (core groove 2a) side of the core shape of the formed lower clad 2 by changing the pressing force on the lower clad 2 and the core resin 4a by the stamper or by devising the shape of the stamper. The depression may be formed at the upper part, the lower part, and the side part of the core 4, and such depression may be controlled using the curing and shrinking properties of the core resin 4a or the lower clad 2.

The shape of the depressed portion in the core 4 is preferably determined not only by the property with respect to separation, but also in view of optical property etc. of the light propagating through the core 4. When the core 4 is formed with the height of 50 μm and width of 50 μm as in the waveguide 10 according to the present embodiment, the amount of depression of each surface is suitably made to about 3 μm to 5 μm to provide a sufficient shearing force resistance and to not adversely affect the optical property.

The core 4 having a cross sectional shape that is depressed inward is formed in the present embodiment, but the shape of the core 4 is not limited thereto, and only needs to be a shape in which the direction the shearing force acting on the interface of the core 4 and the upper and lower clad 2, 3 acts are differed among the microscopic regions of the interface so as to suitably disperse and reduce the shearing force on the entire interface.

For example, the core 4 having a cross section of a shape in which at least one part is depressed inward may be formed. Alternatively, the core 4 having a cross section of a shape in which at least one side of a polygon of the cross section is expanded (curved) outward may be formed.

Therefore, the direction the shearing force generated at the interface of the core 4 and the lower clad 2 or the upper clad 3 acts can be differed among microscopic regions of the interface thereby dispersing and reducing the shearing force on the entire interface and preventing separation of the interface by forming the core 4 having a concave-convex (curved) shape with respect to the center of the cross section at least one part of the outline of a cross section perpendicular to the propagating direction of the light.

In the present embodiment, the ultraviolet curable resin that is cured by irradiating the ultraviolet ray is used for the lower clad 2, the upper clad 3, and the core 4, but the material of each member is not limited thereto. For example, resin that cures under conditions other than light irradiation such as thermosetting resin that cures under thermal condition may be used.

An example in which only one core 4 is formed in one waveguide 10 has been described in the present embodiment, but is not limited thereto. A plurality of cores 4 may be formed on the lower clad 2 or the core 4 may be branched into a Y-shape.

The core 4 may be that in which the propagating direction of the light linearly extends or extends while being curved. The cross sectional shape of the core 4 does not need to be necessarily constant with respect to the propagating direction of the light.

A cover substrate (cover glass) may be further arranged on the upper clad 3 in the waveguide 10.

The upper clad 3 is arranged in the present embodiment, but the upper clad 3 does not necessarily need to be arranged.

In the present embodiment, the stamper having a pattern of the core groove of the waveguide is pressed against the ultraviolet curable resin (polymer) in the molten state or liquid state, and the polymer is cured in such state to transfer (copy) the convex-concave shape of the core groove pattern to the lower clad. The polymer is then filled into the core groove formed in this manner, and the pressing force is applied to the lower clad with a flat stamper thereby forming a concave part depressed towards the center of the core at the cross section of the polymer filled in the core groove. Furthermore, the polymer in the core groove is cured in such state to form the core.

Therefore, the waveguide can be easily manufactured at low cost since the core of the waveguide is manufactured through copying in manufacturing of the waveguide using polymer, that is, the resin waveguide.

Since the cross sectional shape of the core is formed into a wedge shape in the waveguide according to the present embodiment, the portion stretched by the thermal expansion becomes longer, the acceptable amount of the shearing force increases, and the shearing force lowers, the acceptable amount of the shearing force by thermal expansion increases and separation is less likely to occur. In other words, the waveguide according to the present embodiment is manufactured with the core having a depressed cross sectional shape to enhance the shearing force at each interface in order to enhance the separation resistance property with respect to a specific direction of bending.

According to the present invention, the shape of the core is easily formed into a wedge shape, and the waveguide having strong resistance to bending property can be manufactured inexpensively and in large amounts.

The waveguide 10 according to the present embodiment is applicable to the optical fiber for connecting a plurality of communication devices, an optical inter-connection connecting the print substrates, an optical circuit substrate connecting a plurality of circuits through light, an optical integrated circuit for performing information transmission with light in the circuit etc.

Figure 10:
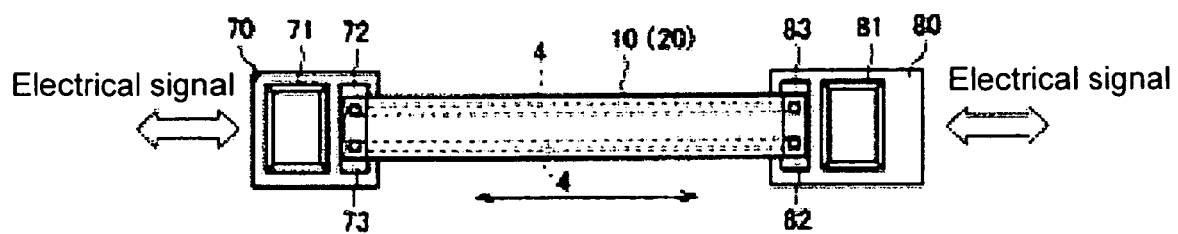
FIG. 10 is a plan view showing one example of a waveguide module according to one embodiment of the present invention.

FIG. 10 is a plan view showing one example of a waveguide module (optical circuit) 90 configured to allow signal transmission with the optical signal between two substrates 70, 80 using the waveguide 10.

More specifically, an integrated circuit (driving and amplifying IC) 71, a light projecting element (VCSEL) 72, and a light receiving element (PD) 73 are arranged on the substrate 70, and an integrated circuit (driving and amplifying IC) 81, a light projecting element 82, and a light receiving element 83 are arranged on the substrate 80.

The integrated circuits 71, 81 each have a function of driving the light projecting element 72, 82 and amplifying the electrical signal transmitted from the light receiving element 73, 83.

Each light projecting element 72, 82 converts the electrical signal transmitted from the integrated circuit 71, 81 to light and exits the same. The light receiving element 72, 82 converts the received light to electrical signal and transmits the same to each integrated circuit 71, 81.

The waveguide 10 includes two cores 4, and the light projecting element 72 and the light receiving element 83, as well as the light projecting element 82 and the light receiving element 73 are optically coupled by each core 4, respectively.

Figure 11:
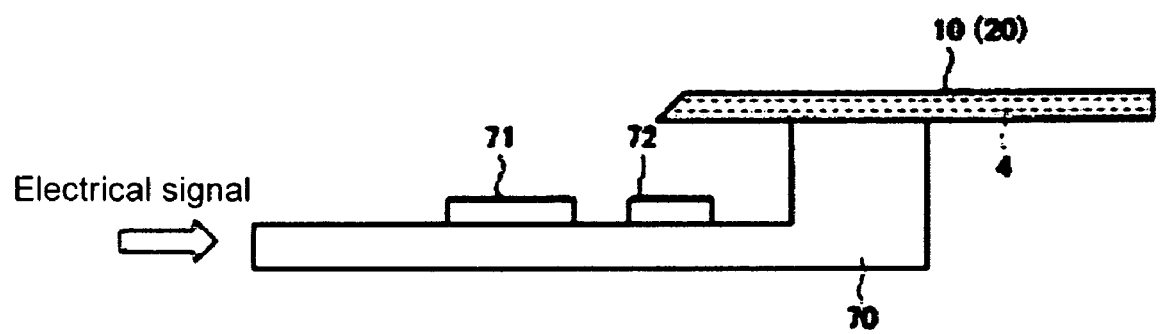
FIG. 11 is a cross sectional view showing a schematic configuration of a connecting part of the waveguide and the substrate in the waveguide module shown in FIG. 10.

FIG. 11 is a cross sectional view showing a schematic configuration of a connecting part of the waveguide 10 and the substrate 70. As shown in the figure, the light projecting element 72 converts the electrical signal transmitted from the integrated circuit 71 to light and enters the converted light to the core 4 of the waveguide 10. That is, the waveguide 10 and the light projecting element 72 are arranged and are optically coupled so that the exit light of the light projecting element 72 enters the core 4 of the waveguide 10. The arrangement relationship between the light projecting element 72 and the waveguide 10 has been illustrated in FIG. 11, but the arrangement relationship between the light projecting element 82 and the waveguide 10 is substantially the same.

The arrangement relationship between the light receiving element 73 and the waveguide 10, and the arrangement relationship between the light receiving element 83 and the waveguide 10 are such that the light propagated via the core 4 of the waveguide 10 enters the light receiving elements 73, 83. The waveguide 10 and the light receiving elements 73, 83 are thus optically coupled.

The waveguide according to the present embodiment is a multi-mode, but the present invention is not limited to the multi-mode waveguide, and is also applicable to a single mode waveguide. The waveguide 10 may have a configuration including a plurality of cores 4, or may have a configuration including only one core 4. For example, the configuration in which only one core 4 is arranged to perform a one-way communication may be adopted.

Figure 12:
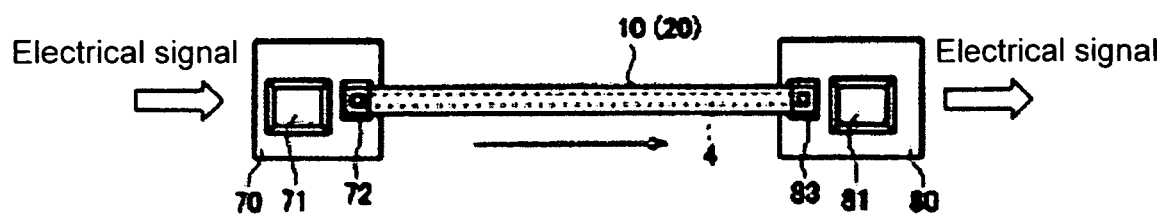
FIG. 12 is a plan view showing another example of a waveguide module according to one embodiment of the present invention.
Figure 13:
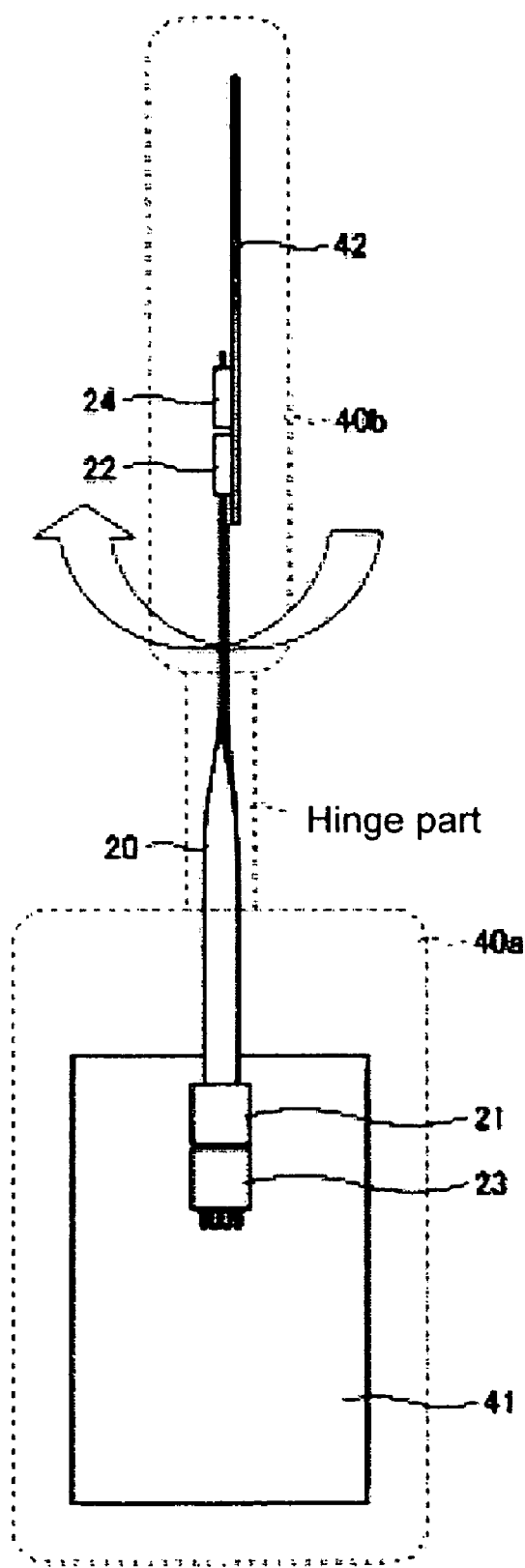
FIG. 13 is a cross sectional view showing a configuration of a portable telephone including a waveguide module according to one embodiment of the present invention.

FIG. 12 is a plan view showing a configuration example of a waveguide module 90 of when the waveguide 10 is used in the one-way communication. As shown in the figure, the light receiving element 73 is not arranged on the substrate 70 on the transmission side and the integrated circuit 71 does not have the amplifying function in the one-side communication. The configuration in which the light projecting element 82 is not arranged on the substrate 80 on the receiving side and the integrated circuit 81 does not have the function (driving function) of transmitting the signal to the light projecting element 82 may be adopted.

The waveguide 10 may be integrated to the light projecting element and the light receiving element so as to be optically coupled thereto or may be removably attached. Only one end side of the waveguide 10 may be integrated to the light projecting element and/or light receiving element so as to be optically coupled thereto.

Embodiment 2

Other embodiments of the present invention will now be described. Same reference characters are denoted for the members having a similar function as in Embodiment 1 for the sake of convenience of explanation, and the description thereof will be omitted.

Similar to Embodiment 1, the waveguide according to the present embodiment includes a core 4 having a concave-convex part at least one part of the cross sectional shape, thereby obtaining the effects substantially the same as the waveguide 10 in Embodiment 1.

However, the present embodiment differs from Embodiments 1 and 2 in that the core 4 is formed using the semiconductor process.

Figure 3A:
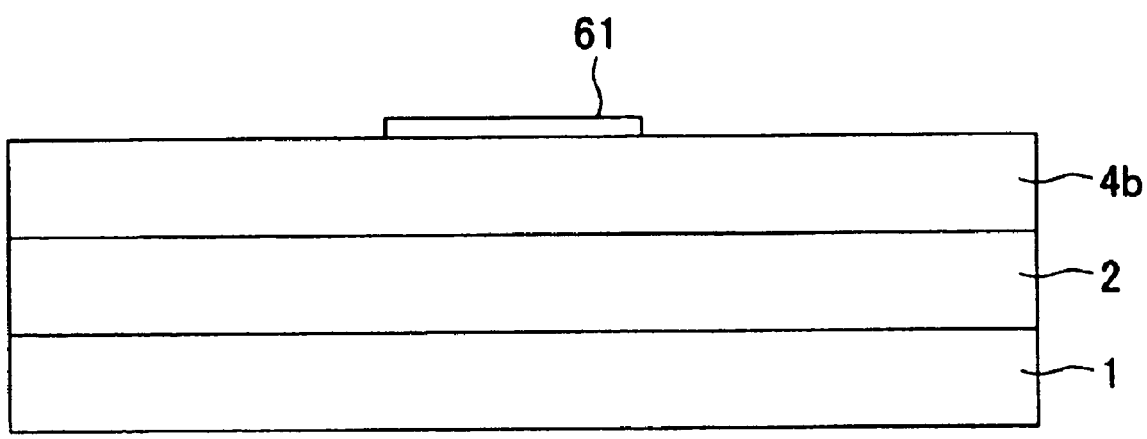
FIG. 3(a) is a cross sectional view showing another example of a manufacturing step of a waveguide according to another embodiment of the present invention.
Figure 3B:
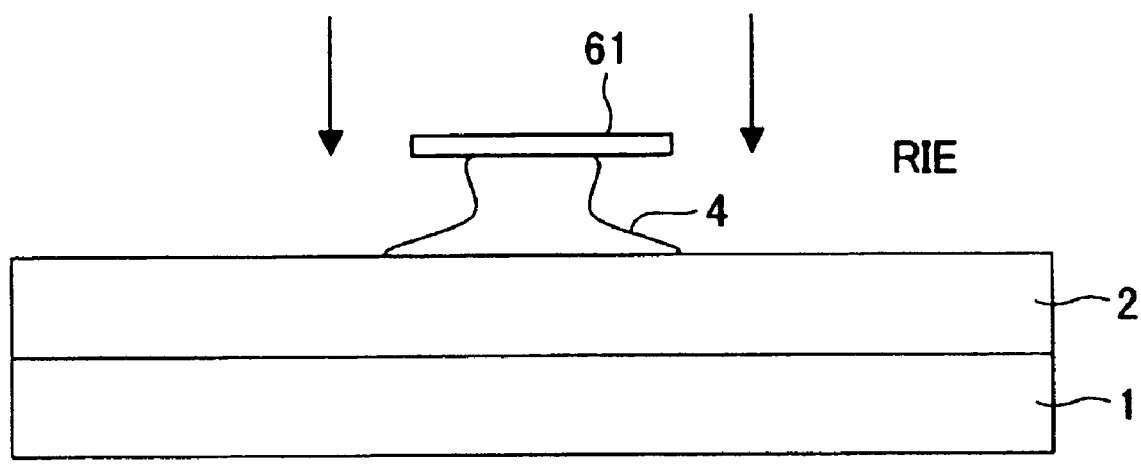
FIG. 3(b) is a cross sectional view showing another example of the manufacturing step of a waveguide according to another embodiment of the present invention.

A method of manufacturing the waveguide according to the present embodiment will now be described. FIGS. 3(a) and 3(b) are cross sectional views showing a part of the manufacturing steps of the waveguide according to the present embodiment.

First, an ultraviolet curable resin (clad material) is deposited on the substrate 1, and cured to form the lower clad 2.

Subsequently, the ultraviolet curable resin (core material) is deposited on the lower clad 2 and cured to form the core layer 4b. The resin having a refraction index higher than the clad material for forming the lower clad is used for the core material for forming the core layer 4b.

A resist (not shown) is then applied to the surface of the core layer 4b, an exposure mask (not shown) is superimposed on the resist, and exposure is carried out by ultraviolet ray irradiation. After exposure, patterning is performed by developing the resist, and the position of forming the core 4 is covered with the resist to act as a mask (etching mask) 61 (see FIG. 3(a)).

As shown in FIG. 3(b), the exposure region of the core layer 4b and one part of the lower part of the mask 61 are removed by reactive ion etching (RIE) from above the mask 61 to form the core 4. The core having a wedge shape distorted in a smooth shape, that is, a shape having both side surfaces depressed inward is formed on both side surfaces at the cross section by controlling the manufacturing parameters (gas flow rate, chamber pressure, plasma output etc.).

The mask 61 is then removed to expose the core 4. The ultraviolet curable resin (clad material) is then deposited on the core 4 and the lower clad 2 and cured to form the upper clad. The waveguide with the core 4 embedded between the lower clad 2 and the upper clad is thereby formed.

The waveguide formed in this manner has the effects substantially the same as the waveguide 10 according to Embodiment 1. The waveguide according to the present embodiment may be a film waveguide having flexibility by removing the substrate 1, similar to a film waveguide 20 according to Embodiment 3 to be hereinafter described. In this case, the effects substantially the same as the film waveguide 20 are obtained.

The resist is used as the mask 61 in the above description, but is not limited thereto, and the mask made of metal etc. may be used.

The shape of both side surfaces at the cross section of the core 4 is controlled by controlling the manufacturing parameters (gas flow rate, chamber pressure, plasma output etc.) in the above description, but the method of controlling the cross sectional shape of the core 4 is not limited thereto. For example, in place of the above method or in addition to the above method, the shape of the upper surface at the cross section of the core 63 may be formed into a shape that is depressed inward by changing the shape of the mask 61.

Figure 4A:
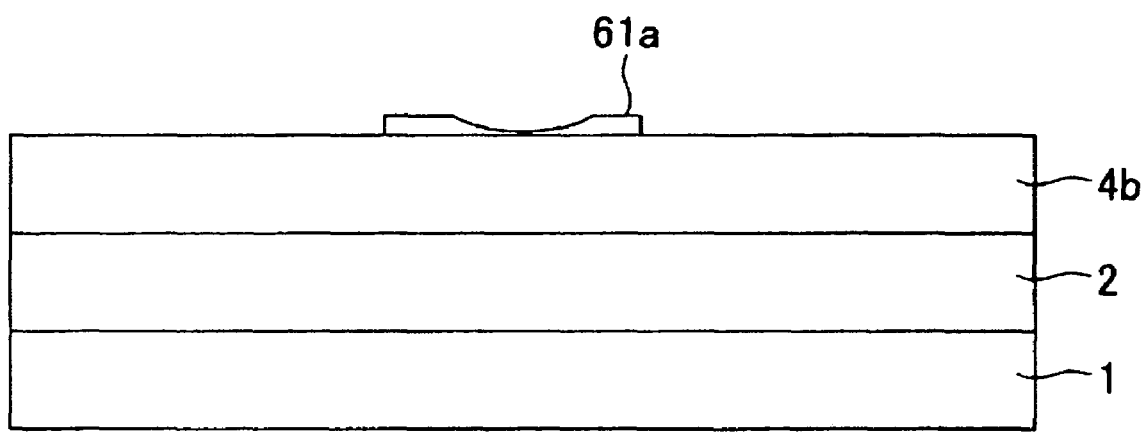
FIG. 4(a) is a cross sectional view showing another further example of a manufacturing step of a waveguide according to another embodiment of the present invention.
Figure 4B:
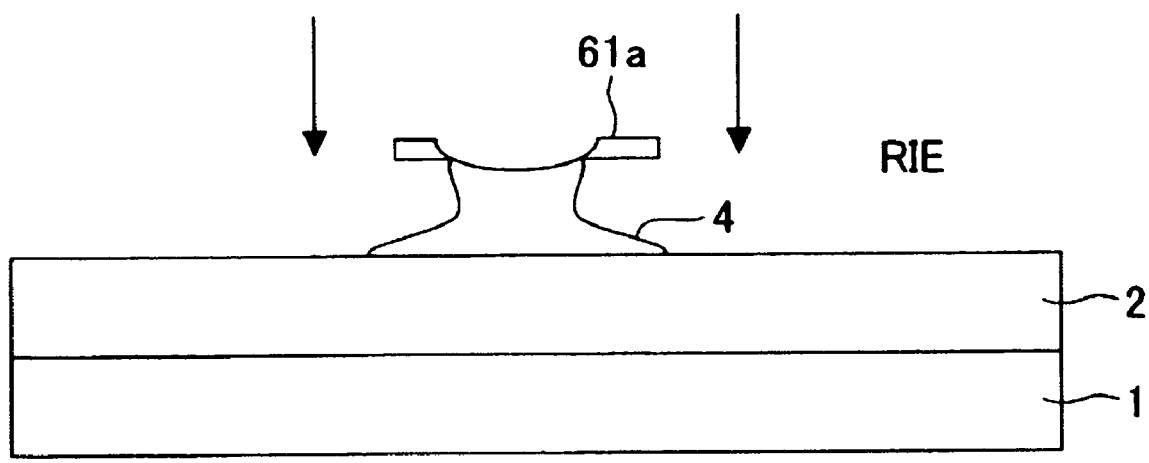
FIG. 4(b) is a cross sectional view showing another further example of the manufacturing step of a waveguide according to another embodiment of the present invention.

FIGS. 4(*a*) and 4(*b*) are cross sectional views showing the manufacturing steps in such case. In the example shown in these figures, a mask 61*a* having a shape in which the central part is depressed is used in place of the mask 61 shown in FIG. 3(*a*). The waveguide is formed with a method similar to the above method other than that the shape of the mask is different.

The position of forming the core 4 is covered with the mask 61*a*, and the exposure region of the core layer 4*b* and one part of the lower part of the mask 61*a* are removed through reactive ion etching (RIE) from above the mask 61*a* to form the core 4 which side surfaces and upper surface at the cross section are depressed inward.

Thereafter, the mask 61*a* is removed to expose the core 4. The ultraviolet curable resin (clad material) is deposited on the core 4 and the lower clad 2 and cured to form the upper clad. The waveguide in which the core 4 is embedded between the lower clad 2 and the upper clad is thereby formed. In this case, since the upper surface of the core 4 has an inwardly depressed shape, the direction the shearing force at the interface of the core 4 and the upper clad acts differs among the microscopic regions of the interface and thus the shearing force on the entire interfaces is dispersed and reduced, whereby the separation at the interface is prevented.

Figure 5:
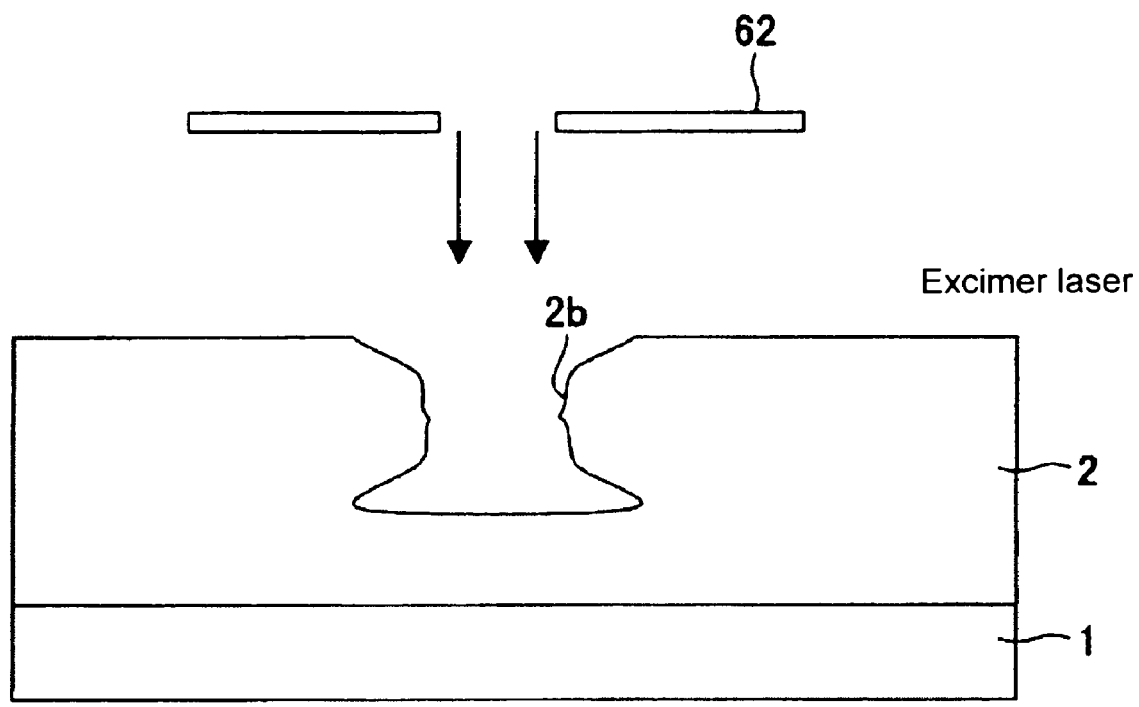
FIG. 5 is a cross sectional view showing another further example of a manufacturing step according to another embodiment of the present invention.

The core 4 is formed using reactive ion etching (RIE) in the above description, but is not limited thereto, and may be formed using other semiconductor processes. For example, the core 4 may be formed using excimer laser. FIG. 5 is a cross sectional view showing the manufacturing steps for such case.

First, the ultraviolet curable resin (clad material) is deposited on the substrate 1 and cured to form the lower clad 2.

As shown in FIG. 5, the excimer laser is irradiated through the mask 61*b* formed with an opening at the central part according to the shape of the core 4 to be formed onto the lower clad 2 to form the core groove (groove part) 2*b* in the lower clad 2. The processing shape of the core groove 2*b* can be changed by changing the energy density of the excimer laser, and the core groove 2*b* that is relatively linear but has a cross section of a wedge shape can be formed.

The ultraviolet curable resin (core resin) having a refraction index greater than the lower clad 2 is injected to the core groove 2*b*, and is pressed with a glass plate etc. to fill the ultraviolet curable resin into the core groove 2*b*, and ultraviolet ray is irradiated to cure the ultraviolet curable resin thereby forming the core 4.

After the glass substrate etc. is separated, the core 4 on the lower clad 2 is thinly spread by the spin coater. Thereafter, the resin having a refraction index smaller than the core 4 and that is to become the upper clad 3 is applied and exposed, thereby completing the waveguide.

The waveguide formed in this manner has a core 4 having a shape substantially the same as the core groove 2*a* having a cross section of the wedge shape, and thus effects substantially similar to the waveguide 10 according to Embodiment 1 are obtained. In the waveguide formed in this manner, the substrate 1 may be removed to obtain a flexible film waveguide. In this case, the effects substantially similar to the film waveguide 20 according to Embodiment 3 to be hereinafter described are obtained.

Embodiment 3

Other further embodiments of the present invention will now be described. Same reference characters are denoted for the members having a similar function as in Embodiment 1 for the sake of convenience of explanation, and the description thereof will be omitted.

With respect to the film waveguide (waveguide) 20 according to the present embodiment, the film waveguide (film waveguide) 20 having flexibility and having a total thickness of 300 μm is obtained by forming the upper and lower clad 2, 3 with thin thickness and removing the substrate (glass substrate) 1 in the waveguide 10 according to Embodiment 1. That is, the film waveguide 20 is configured by a stacked body of resin layers having a total thickness of 300 μm and flexibility so as to be used in a bent manner, used winded around the shaft etc., arranged so as to be allowed to be twisted etc.

In the film waveguide 20, the acceptable amount with respect to the shearing force by stretching property increases etc., and separation is less likely to occur even when used in a bent manner or when used in a twisted manner by forming the core 4 similar to Embodiment 1.

The film waveguide 20 can be used similar to the waveguide 10 described in Embodiment 1. In other words, the waveguide 20 is applicable as an optical fiber for connecting a plurality of communication devices, an optical inter-connection for connecting the print substrates, an optical circuit substrate for connecting a plurality of circuits through light, an optical integrated circuit for performing information transmission employing light in the circuit etc.

The film waveguide 20 may be arranged in place of the waveguide 10 in the waveguide module 90 described in Embodiment 1. That is, the film waveguide module may be configured with the film waveguide 20 and the light projecting element and/or light receiving element optically coupled.

The film waveguide 20 with enhanced resistance to separation in time of bend may be used for the following applications.

First application includes use in the hinge part at the foldable electronic device (information processing device, optical transmission device) such as foldable PHS (Personal Handyphone System), foldable PDA (Personal Digital Assistant), foldable laptop etc.

FIGS. 6(*a*) to 6(*c*) show an example of applying the film waveguide 20 to the foldable portable telephone 40. FIG. 6(*a*) is a perspective view showing the outer appearance of the foldable portable telephone 40 incorporating the film waveguide 20.

Figure 6A:
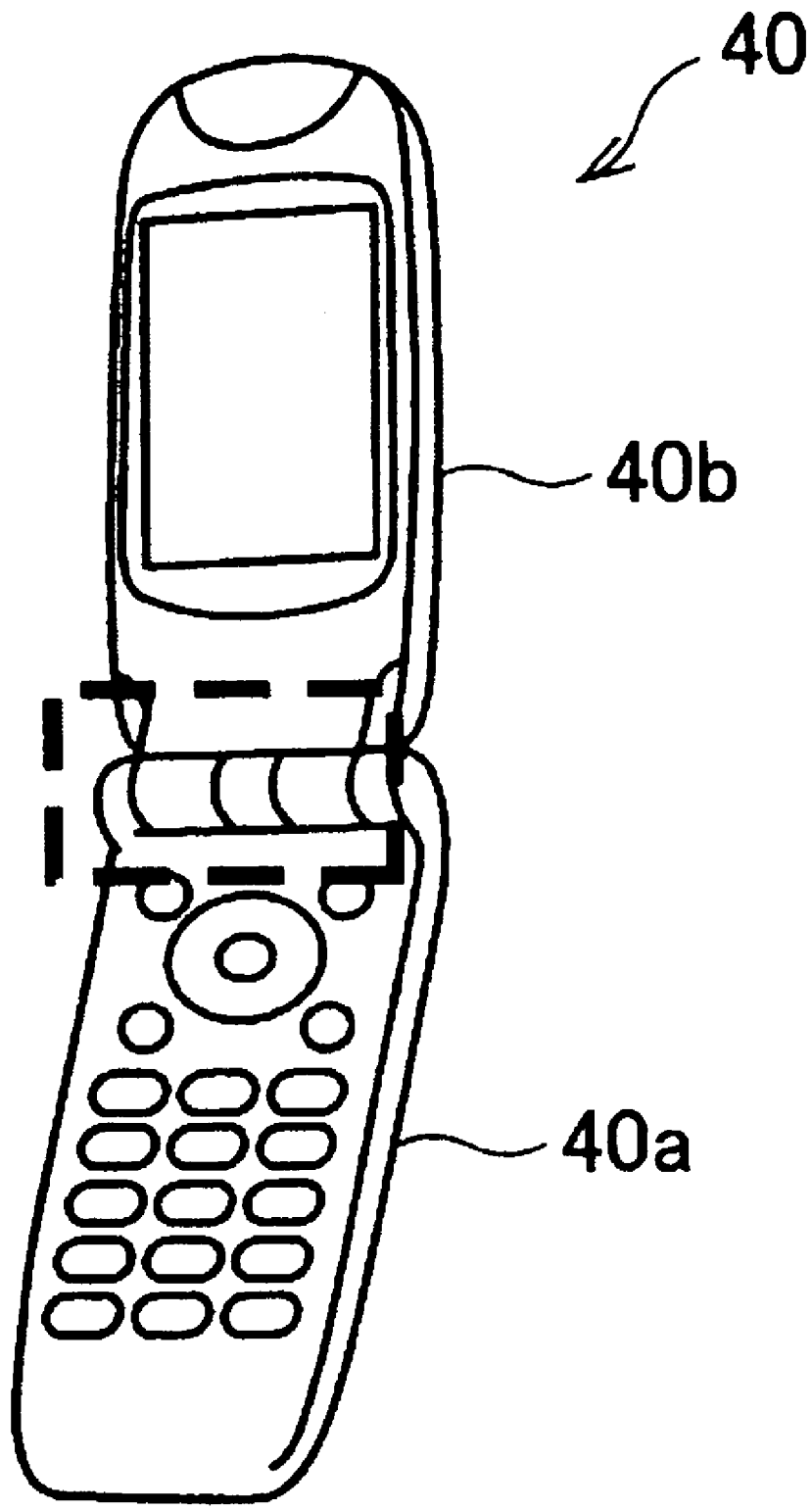
FIG. 6(a) is a perspective view showing an outer appearance of a foldable portable telephone equipped with a waveguide (film waveguide) according to another further embodiment of the present invention.
Figure 6B:
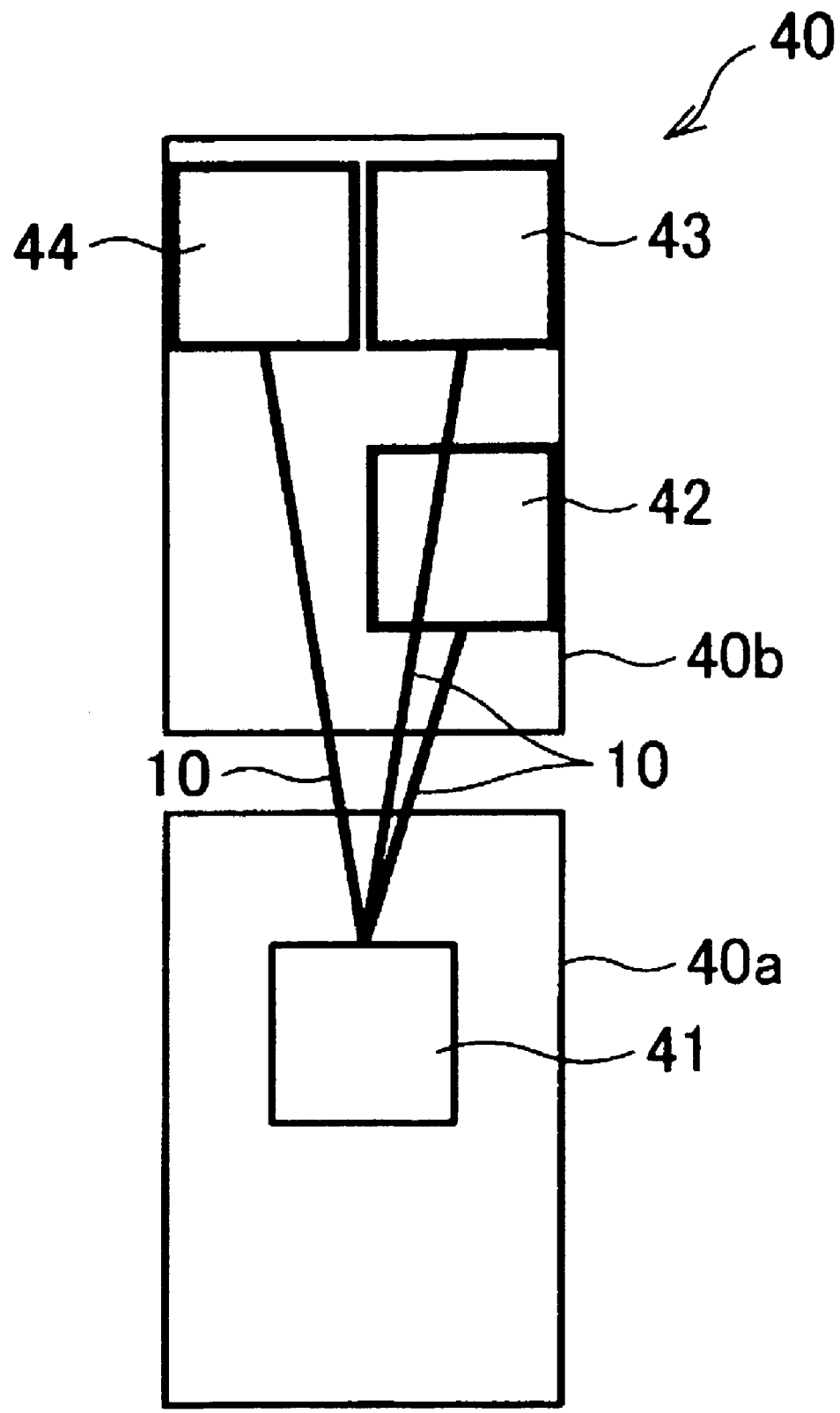
FIG. 6(b) is a block diagram showing the portion applied with the film waveguide of the present invention in the foldable portable telephone shown in FIG. 6(a).

FIG. 6(b) is a block diagram of the portion applied with the film waveguide 20 in the foldable portable telephone 40 shown in FIG. 6(a). As shown in the figure, the control part 41 arranged on the main body 40a side and an external memory 42, a camera part (digital camera) 43, and a display part (liquid crystal display) 44 arranged on the lid (driving part) 40b side, rotatably arranged with the hinge part as the shaft at one end of the main body, in the foldable portable telephone 40 are respectively connected by the film waveguide 20.

Figure 6C:
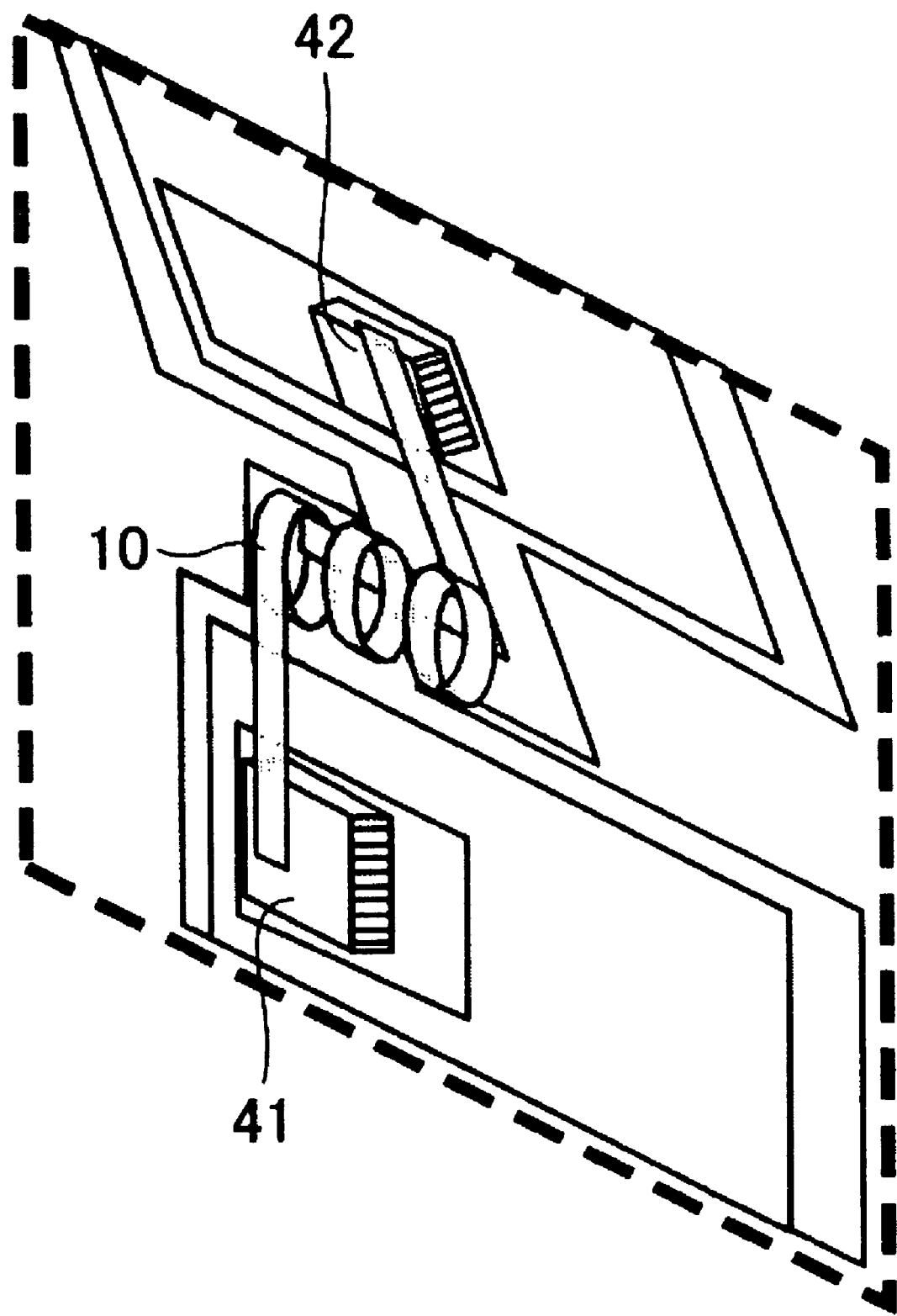
FIG. 6(c) is a perspective plan view of the hinge part in the foldable portable telephone shown in FIG. 6(a).

FIG. 6(c) is a perspective plan view of the hinge part (portion surrounded by a broken line) in FIG. 6(a). As shown in the figure, the film waveguide 20 is winded and bent around the supporting rod at the hinge part to connect the control part arranged on the main body side, and the external memory 42, the camera part 43, and the display part 44 arranged on the lid side.

When the film waveguide 20 is applied to the foldable electronic device, high speed, large volume communication is realized in a limited space. Therefore, it is particularly suitable for devices that require high speed and large volume data communication and on which miniaturization is demanded such as foldable liquid crystal display device etc.

Figure 14:
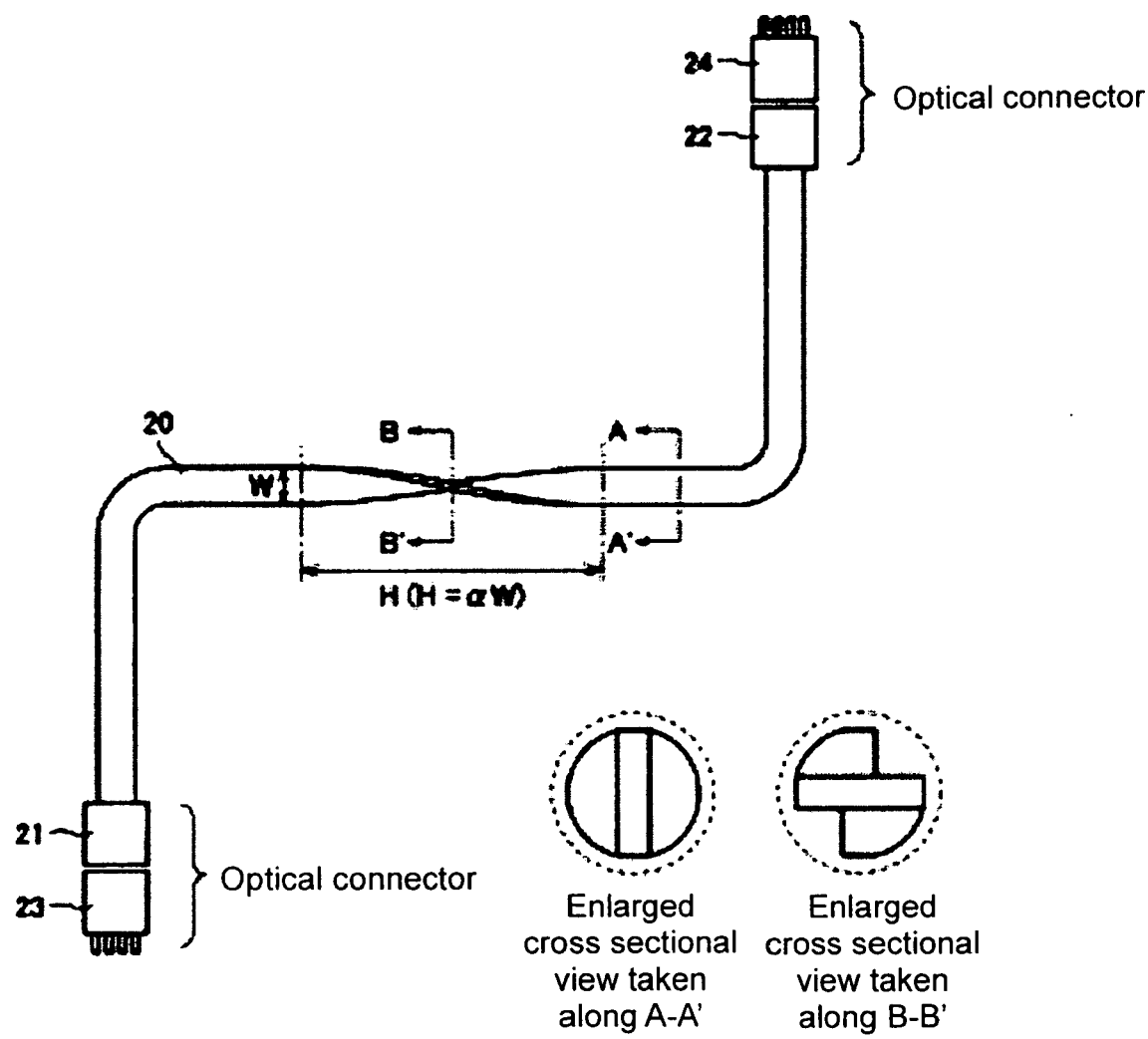
FIG. 14 is a plan view of the waveguide module arranged in the portable telephone shown in FIG. 13.
Figure 15:
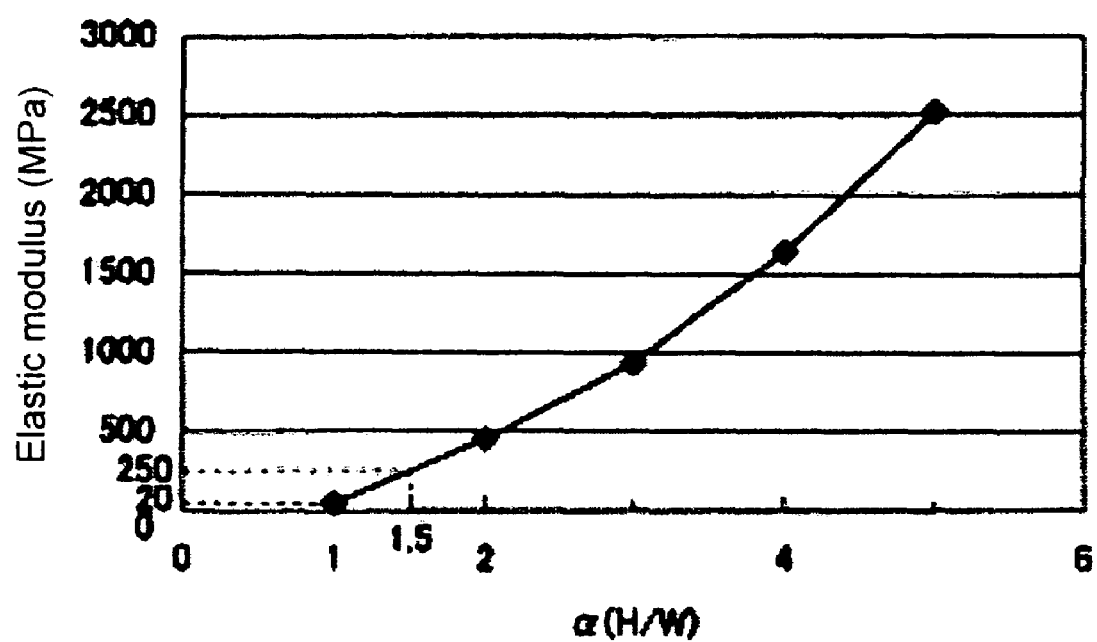
FIG. 15 is a graph showing the relationship between the length of the twisted portion and the elastic modulus of the waveguide for having the tensile force acting on the joining part to be smaller than or equal to 0.5 kgf in the waveguide module shown in FIG. 14.

Recent portable telephones include that in which the main body 40a and the lid part 40b are rotatable with the respective adjacent direction as the axis, as shown in FIG. 14, etc. Furthermore, in the portable telephone shown in FIG. 6(a), the portable telephone having a configuration of a biaxial rotation type such as a portable telephone in which the lid 40b is also rotatable in a direction orthogonal with respect to the rotating direction (opening and closing direction) is becoming popular. FIG. 15 is a plan view showing one configuration example of the waveguide 20 arranged in the electronic device having the biaxial rotation type configuration.

As shown in FIGS. 14 and 15, the film waveguide 20 used in the electronic device including the driving part sometimes twists with the light extending direction of the film waveguide 20 as the axis depending on the rotating direction (or moving direction) of the driving part.

Considering the space for wiring (installation space of film waveguide 20), the length of the twisted portion is short. For example, as shown in FIG. 15, $\alpha$ is made as small as possible with the width (width in the direction perpendicular to the stacking direction of the upper and lower clad layers 2, 3) of the film waveguide 20 as W, and the length of the twisted portion as H (H = $\alpha \cdot$ W).

However, if the length of the twisted portion is too short, the shape of the film waveguide 20 may distort, whereby the transmission property deteriorates. Specifically, if the value of $\alpha$ is less than 1, the transmission property of the film waveguide 20 deteriorates. Therefore, in order to save the installation space of the film waveguide 20 without deteriorating the transmission property, the value of $\alpha$ is a value greater than or equal to 1 and a value close as much as possible to one. Typically, the value is greater than or equal to 1 and less than or equal to 1.5.

When twist occurs as above, the tensile force acts by the repulsive force of the twist on the joining part of the film waveguide 20 and the substrate (e.g., between optical connector 21, 22 arranged in the film waveguide 20 and optical connector 23, 24 arranged on the substrate side) (see FIG. 15), which may cause connection failure. The tensile force must be suppressed to lower than or equal to 0.5 kgf to prevent the connection failure caused by the tensile force acting on the joining part.

The size of the tensile force caused by the twist of the film waveguide 20 depends on the ratio ($\alpha$=H/W) of the length H of the twisted portion and the width W of the film waveguide 20, and the elastic modulus of the film waveguide 20. FIG. 16 is a graph showing the relationship between the value of $\alpha$ and the elastic modulus for having the tensile force acting on the joining part to smaller than or equal to 0.5 kgf.

As shown in the figure, the elastic modulus is made to greater than or equal to 20 MPa and less than or equal to 250 MPa so that $\alpha$ is greater than or equal to 1 and less than or equal to 1.5, and the tensile force acting on the joining part is smaller than or equal to 0.5 kgf. The connection failure is thereby prevented and the installation space of the film waveguide 20 is reduced.

In the electronic device having the "twisted configuration" of the prior art, a wiring in which a plurality of extremely small coaxial cables are twisted is used from the problem of rewinding property. That is, the twisted configuration is realized in which the twisted state is the narrowest and the narrowed portion loosens (produce extra length) in the non-twisted state. In such configuration, however, the diameter of the hinge part tends to increase. Furthermore, in such configuration, the wiring tends to contact the housing due to the twisting operation (or bending operation), whereby the transmission property (high frequency property, EMI property) deteriorates due to abrasion.

The film waveguide 20, on the other hand, can be twisted with a single wiring. That is, as shown in the cross sectional view of the cross section taken along A-A', and the cross sectional view of the cross section taken along B-B' shown in FIG. 15, when the film waveguide 20 is arranged inside a cylinder configuring the hinge part, the inner diameter of the hinge part can be determined solely by the wiring width W. Therefore, the extra length portion as in the prior art becomes unnecessary, and thus the hinge configuration can be miniaturized, and the installation space of the hinge configuration can be reduced.

In the film waveguide 20, the outer layer of the wiring is the clad layer that is not directly related to the propagation of the light. Thus, even if abrasion of the wiring occurs, the influence of the abrasion on the transmission property is greatly reduced compared to when an extremely narrow coaxial cable of the prior art is used.

The connection failure is prevented from occurring by the tensile force generated at the connecting part on both ends even when arranged with the twisted state as a steady state, for example, by setting the elastic modulus of the film waveguide 20 to the above conditions. Therefore, the holding configuration etc. for reducing the tensile force generated at the connecting part does not need to be arranged.

In a second application, the film waveguide 20 is applied to a device (optical transmission device) including a driving part such as a printer head in a printing device, a reading part in a hard disc recording and reproducing device etc.

Figure 7A:
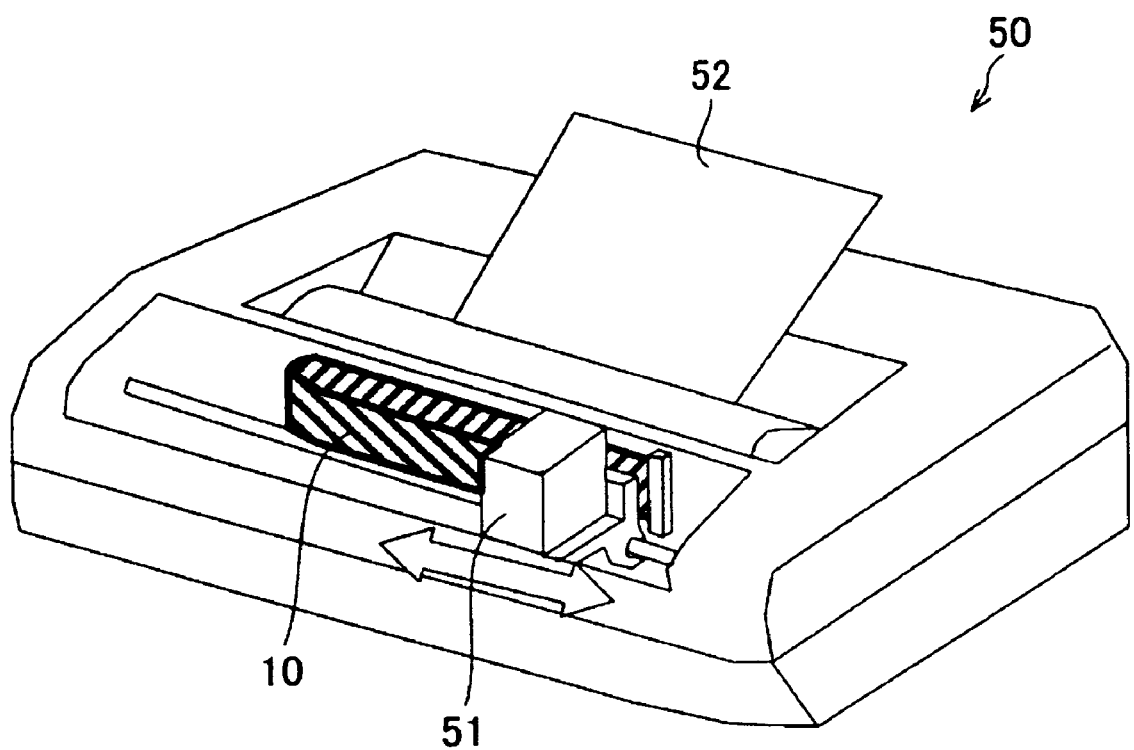
FIG. 7(a) is a perspective view showing the outer appearance of a printing device equipped with a waveguide (film waveguide) according to another further embodiment of the present invention.
Figure 7B:
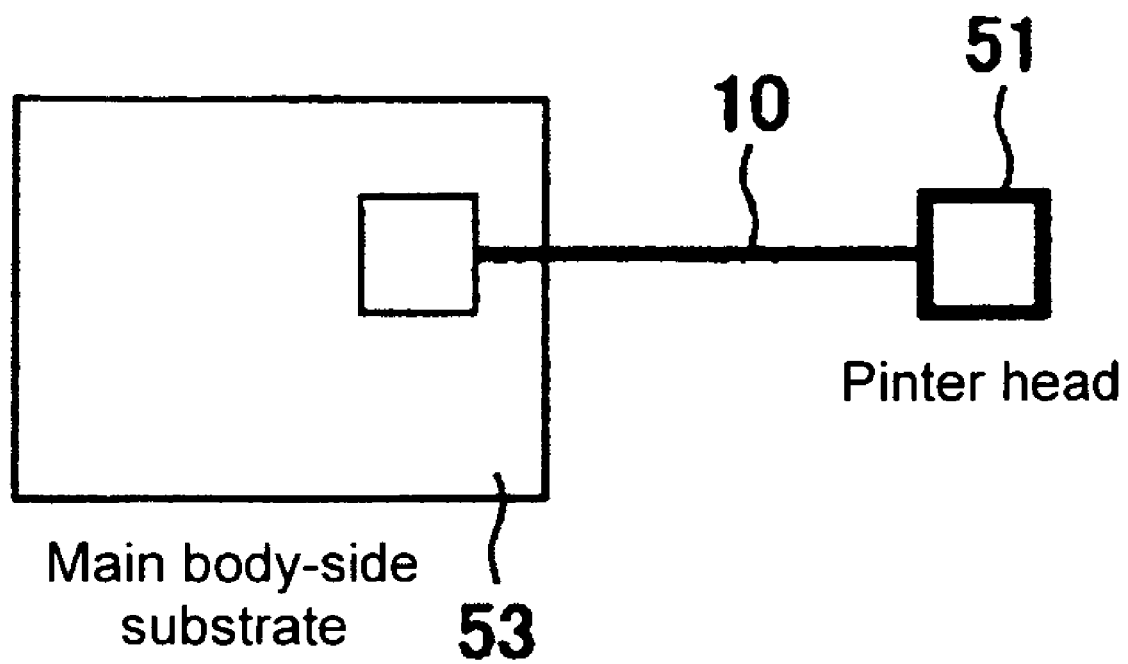
FIG. 7(b) is a block diagram of the portion applied with the film waveguide according to another further embodiment of the present invention in the printing device shown in FIG. 7(a).
Figure 7C:
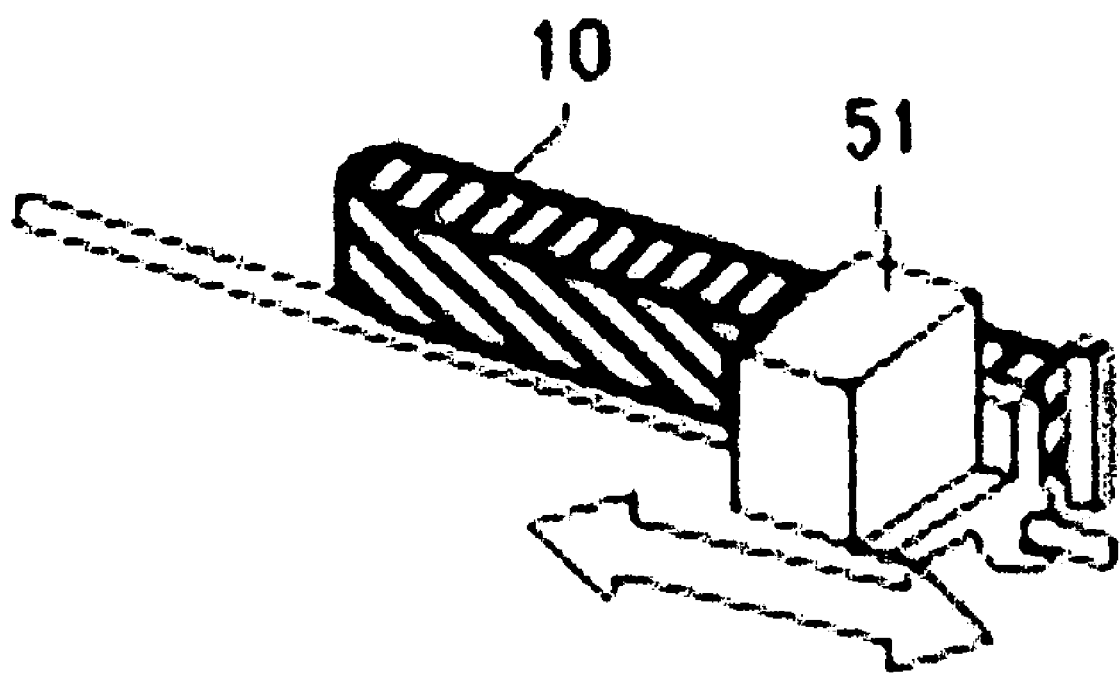
FIG. 7(c) is a perspective view showing a curved state of a waveguide (film waveguide) according to another further embodiment of the present invention in the printing device shown in FIG. 7(a).

FIGS. 7(a) to 7(c) show an example of applying the film waveguide 20 to a printing device 50. FIG. 7(a) is a perspective view showing the outer appearance of the printing device 50. As shown in the figure, the printing device 50 includes a printer head 51 for performing printing with respect to a paper 52 while moving in the width direction of the paper 52 and one end of the film waveguide 20 is connected to the printer head 51.

FIG. 7(b) is a block diagram of a portion applied with the film waveguide 20 in the printing device 50. As shown in the figure, one end of the film waveguide 20 is connected to the printer head 51 and the other end is connected to the main body side substrate in the printing device 50. A control means etc. for controlling the operation of each part of the printing device 50 is arranged in the main body side substrate.

Figure 7D:
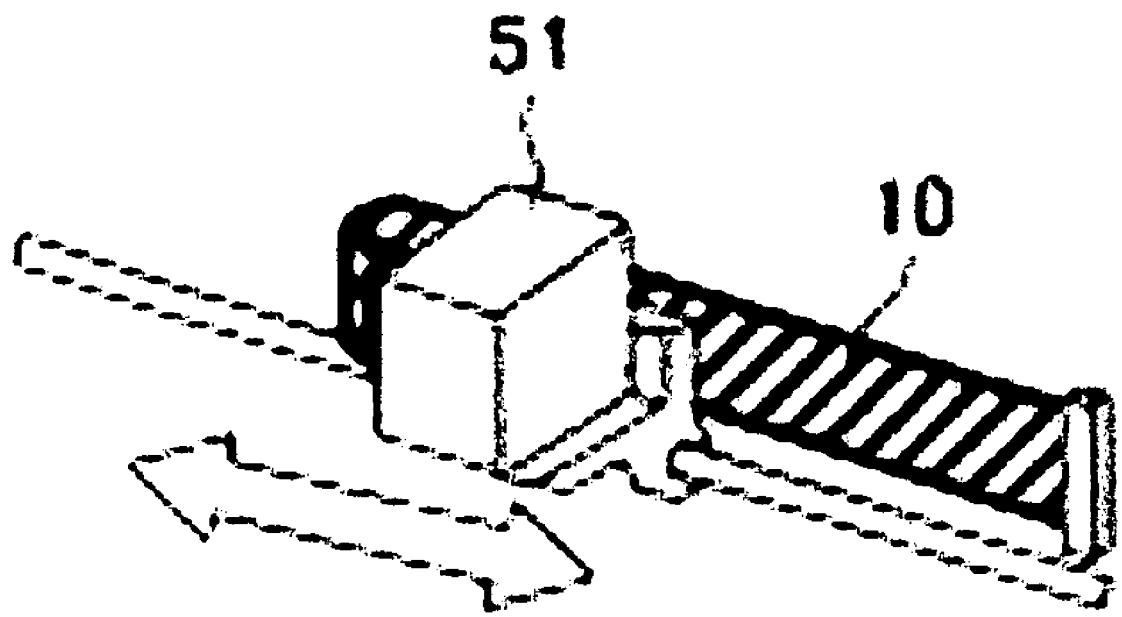
FIG. 7(d) is a perspective view showing a curved state of a waveguide (film waveguide) according to another further embodiment of the present invention in the printing device shown in FIG. 7(a).

FIGS. 7(c) and 7(d) are perspective views showing a curved state of the film waveguide 20 of when the printer head 51 is moved (driven) in the printing device 50. As shown in the figure, when the film waveguide 20 is applied to the driving part such as the printer head 51, the curved state of the film waveguide 20 changes with the drive of the printer head 51, and each position of the film waveguide 20 is repeatedly curved, and the shearing force repeatedly acts between the core 4 and each clad.

Therefore, when connecting the film waveguide to the driving part, in particular, the film waveguide excelling in the shearing force resistance must be used, and the film waveguide 20 according to the present embodiment is suitable for such driving part. High speed, large volume communication using the driving part can be realized by applying the film waveguide 20 to the driving part.

Figure 8:
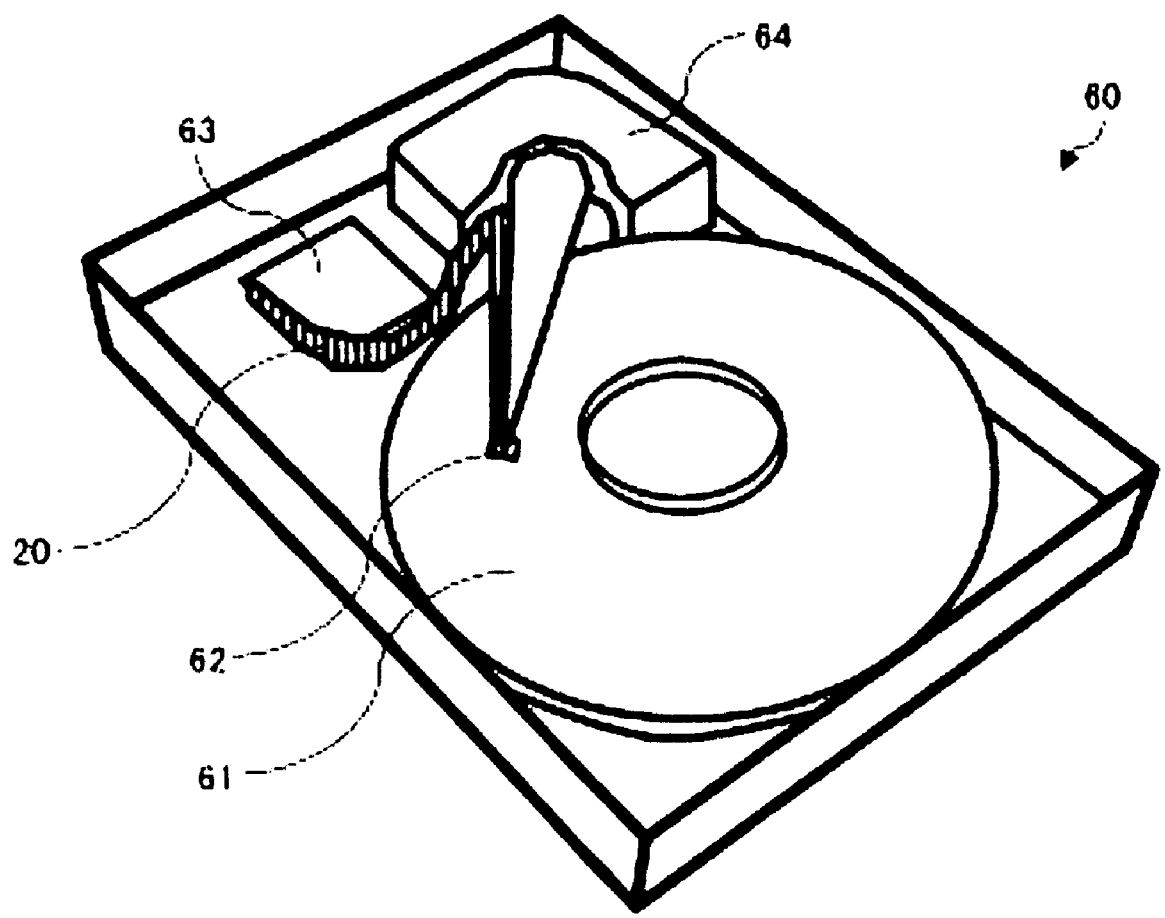
FIG. 8 is a perspective view showing the outer appearance of a hard disc recording and reproducing device equipped with a waveguide (film waveguide) according to another further embodiment of the present invention.
Figure 9A:
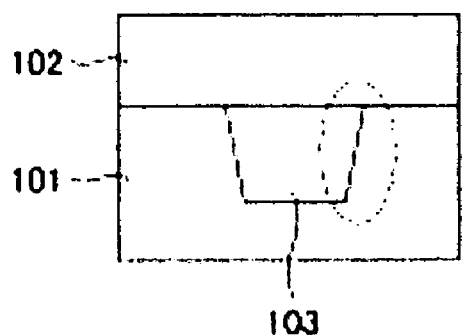
FIG. 9(a) is a cross sectional view of a conventional film waveguide, that is, a film waveguide which cross sectional shape of the core is a trapezoid or a rectangle.
Figure 9A:
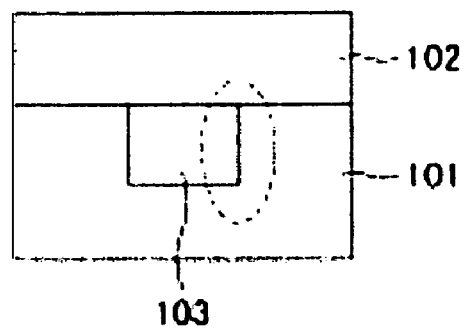
Figure 9B:
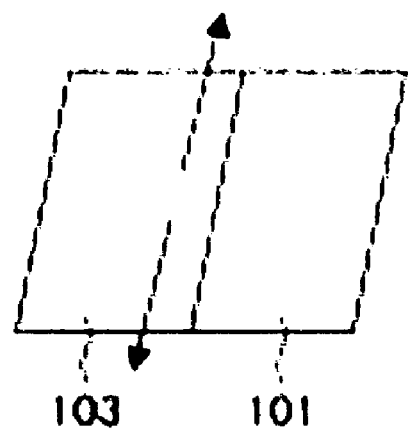
FIG. 9(b) is a cross sectional view showing the shearing force generated at the interface of the core and the lower clad in each film waveguide shown in FIG. 9(a).
Figure 9B:
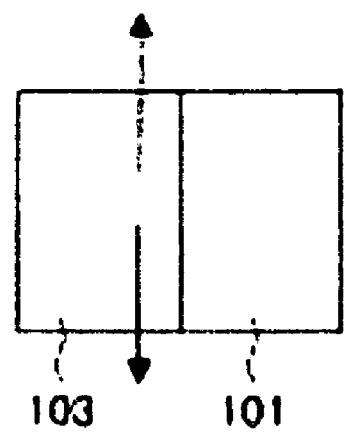

FIG. 8 shows an example in which the film waveguide 20 is applied to the hard disc recording and reproducing device (optical transmission device) 60.

As shown in the figure, the hard disc recording and reproducing device 60 includes a disc (hard disc) 61, a head (reading and writing head) 62, a substrate introducing part 63, a driving part (driving motor) 64, and the film waveguide 20.

The driving part 64 drives the head 62 in the radius direction of the disc 61. The head 62 reads the information recorded on the disc 61, and writes the information on the disc 61. The head 62 is connected to the substrate introducing part 63 by way of the film waveguide 20, propagates the information read from the disc 61 to the substrate introducing part 63 as the optical signal, and receives the optical signal of the information propagated from the substrate introducing part 63 and to be written to the disc 61.

The separation that occurs in the waveguide is prevented and high-speed large volume communication is realized by applying the film waveguide 20 to the driving part such as the head 62 in the hard disc recording and reproducing device 60.

The total thickness of the film waveguide 20 is not particularly limited, but is thinner within a range of realizing the necessary optical property, or is less than or equal to 300 μm etc. If the total thickness is less than or equal to 300 μm, the film waveguide is suited to be used in a bent manner and to be used winded to the shaft etc. It is also suitable in reducing the installation space of the film waveguide 20, and miniaturizing the device arranged with the film waveguide 20.

The present invention is not limited to each of the above embodiments, and various modifications can be made within the scope of the claims, and the embodiments obtained by appropriately combining the technical means disclosed in the difference embodiments is also encompassed in the technical scope of the present invention.

The present invention is applicable to the overall waveguide used in communication employing light and energy transmission. The present invention is also applicable to a film waveguide excelling in flexibility. In this case, the present invention is particularly suited for application to the hinge part of foldable devices such as foldable portable telephone, foldable PUS (Personal Handyphone System), foldable PDA (Personal Digital Assistant), foldable laptop etc., or to a device including the driving part such as the printer head in the printing device and the reading part in the hard disc. The present invention is particularly suited to a device in which large volume of data must be transmitted at high speed such as foldable liquid crystal display device etc.

The invention claimed is:

1. A method of manufacturing a waveguide including a core for enclosing and propagating light and a clad layer including a groove part for surrounding the core, the method comprising the steps of:
    forming the groove part on a surface of the clad layer made up of first resin;
    filling a second resin into the groove part; and
    forming the core by applying pressure to the clad layer to deform the shape of the groove part, and curing the second resin while deforming the second resin according to the deformation of the shape of the groove part.

2. The method of manufacturing the waveguide according to claim 1, wherein in the step of forming the groove part, the resin layer is cured while pressure contacting a stamper having an inverse pattern of the groove part to a resin layer made up of the first resin to form the upper clad layer.

3. A method of manufacturing a waveguide including a core for enclosing and propagating light, and a clad layer including a groove part for surrounding the core, the method comprising the steps of:
    forming the groove part in the clad layer so that at least one part of the side surface or the bottom surface of the groove part is curved so as to project towards the center of the cross section of the groove part; and
    forming the core by filling and curing a second resin in the groove part.

4. The method of manufacturing the waveguide according to claim 3, wherein in the step of forming the groove part, the groove part is formed by irradiating energy beam through a shielding including an opening.

5. A method of manufacturing a waveguide including a core for enclosing and propagating light, and a clad layer including a groove part for surrounding the core, the method comprising the steps of:
    depositing a second resin on a first clad layer to form a core layer;
    forming a core having a shape in which at least one part of an outline of a cross section perpendicular to an optical axis direction of the light propagating through the core is curved so as to be depressed towards the center of the cross section by performing etching on the core layer; and
    forming a second clad layer to cover the core and the first clad layer.

6. The method of manufacturing the waveguide according to claim 5, wherein in the step of forming the core, the core is formed by performing reactive ion etching through a shielding.

* * * * *